US011907955B2

(12) United States Patent
Fang et al.

(10) Patent No.: US 11,907,955 B2
(45) Date of Patent: Feb. 20, 2024

(54) SYSTEM AND METHOD FOR BLOCKCHAIN AUTOMATIC TRACING OF MONEY FLOW USING ARTIFICIAL INTELLIGENCE

(71) Applicant: Anchain.ai Inc., San Jose, CA (US)

(72) Inventors: Chunsheng Victor Fang, San Jose, CA (US); Wei Quan, San Jose, CA (US); Han Xu, San Jose, CA (US); Shuling He, San Jose, CA (US)

(73) Assignee: Anchain.ai Inc., San Jose, CA (US)

( * ) Notice: Subject to any disclaimer, the term of this patent is extended or adjusted under 35 U.S.C. 154(b) by 483 days.

(21) Appl. No.: 17/357,029

(22) Filed: Jun. 24, 2021

(65) Prior Publication Data

US 2022/0067738 A1 Mar. 3, 2022

Related U.S. Application Data

(63) Continuation-in-part of application No. 17/006,431, filed on Aug. 28, 2020, now Pat. No. 11,436,615.

(51) Int. Cl.
*G06Q 20/40* (2012.01)
*G06Q 40/02* (2023.01)
(Continued)

(52) U.S. Cl.
CPC ... *G06Q 20/4016* (2013.01); *G06Q 20/38215* (2013.01); *G06Q 20/405* (2013.01);
(Continued)

(58) Field of Classification Search
CPC ........ G06Q 20/40; G06Q 20/38; G06Q 40/02; H04L 9/32
See application file for complete search history.

(56) References Cited

U.S. PATENT DOCUMENTS 11,379,844 B2 * 7/2022 Galka ............... G06F 16/9024
2019/0034939 A1 * 1/2019 Thomas ............... G06N 7/01
(Continued)

OTHER PUBLICATIONS

Machine Learning in/for Blockchain: Future and Challenges Chen.
(Continued)

*Primary Examiner* — Scott S Trotter
(74) *Attorney, Agent, or Firm* — Rowan TELS LLC

(57) ABSTRACT

A method and apparatus that receive blockchain transaction data from a blockchain ledger to a transaction database, receive intelligence labels from a blockchain ecosystem intelligence database, select a blockchain transaction flow comprising blockchain transactions associated with a digital account source address, digital account intermediate addresses, a digital account destination address, and intermediate transactions, receive input trace parameters, where the input trace parameters include at least one of an objective directional setting, a tracing constraint, and a transaction filter, the transaction filter based on the transaction timestamps and the digital assets transferred, apply the intelligence labels to the digital account source address, the digital account intermediate addresses, and the digital account destination address, apply an artificial intelligence graph search algorithm to the blockchain transaction flow based on the input trace parameters, and generate a report including tracing destination summary statistics of the auto-traced path.

20 Claims, 24 Drawing Sheets

(51) Int. Cl.
*H04L 9/32* (2006.01)
*G06Q 20/38* (2012.01)
*H04L 9/00* (2022.01)

(52) U.S. Cl.
CPC ........... *G06Q 20/407* (2013.01); *G06Q 40/02* (2013.01); *H04L 9/3297* (2013.01); *H04L 9/50* (2022.05); *H04L 2209/56* (2013.01)

(56) References Cited

U.S. PATENT DOCUMENTS

| | | | |
|---|---|---|---|
| 2019/0172067 A1* | 6/2019 | Arora | G06Q 20/389 |
| 2019/0279215 A1* | 9/2019 | Kuchar | G06Q 20/065 |
| 2021/0042421 A1 | 2/2021 | Li et al. | |
| 2021/0110047 A1 | 4/2021 | Fang | |
| 2021/0182859 A1 | 6/2021 | Rao et al. | |
| 2021/0390549 A1 | 12/2021 | Rule et al. | |

OTHER PUBLICATIONS

Scalable Graph Learning for Anti-Money Laundering: A First LookNeurIPS 2018 Workshop on Challenges and Opportunities for AI in Financial Services: the Impact of Fairness, Explainability, Accuracy, and Privacy, Montreal, Canada.

* cited by examiner

SYSTEM AND METHOD FOR BLOCKCHAIN AUTOMATIC TRACING OF MONEY FLOW USING ARTIFICIAL INTELLIGENCE

This is a continuation-in-part of U.S. application Ser. No. 17/006,431 filed Aug. 28, 2020, which is incorporated herein by reference in its entirety.

BACKGROUND

Cryptocurrency offers a decentralized system to exchange funds in the form of digital assets. Due to the decentralized nature of the blockchain, tracing the origin of the funds and final destination of transactions may be difficult. However, as the value of cryptocurrency has risen, individuals and organizations have emerged that attempt to utilize this system to transfer funds to malicious entities or launder funds to hide their illicit origins. Due to the potential risks associated with cryptocurrency, regulations have been emplaced to prevent the money laundering and the funding of terrorism. Many legitimate cryptocurrency exchanges are required to comply with the regulations if they wish to continue to operate. These exchanges, however, struggle to identify transactions or accounts that may potentially violate these regulations. This places them at risk of not complying with the regulations. Therefore, a need exists for a way to identify transactions and/or accounts that carry an increased risk of violating financial regulations. There is further a need for a system and method to effectively and accurately trace money flow for investigative purposes.

BRIEF SUMMARY

In one aspect, a method includes receiving blockchain transaction data from a blockchain ledger to a transaction database, the blockchain transaction data including blockchain addresses, transaction identifications, transaction timestamps, and digital assets transferred, receiving intelligence labels from a blockchain ecosystem intelligence database, where the intelligence labels include known behavioral characteristics of entities associated with the blockchain addresses, selecting a blockchain transaction flow comprising blockchain transactions associated with a digital account source address, digital account intermediate addresses, a digital account destination address, and intermediate transactions, where the intermediate transactions transfer the digital assets between the digital account source address and the digital account destination address, receiving input trace parameters, where the input trace parameters include at least one of an objective directional setting, a tracing constraint, and a transaction filter, the transaction filter based on the transaction timestamps and the digital assets transferred, applying the intelligence labels to the digital account source address, the digital account intermediate addresses, and the digital account destination address, thereby creating labeled account addresses, applying an artificial intelligence graph search algorithm to the blockchain transaction flow based on the input trace parameters, to determine an auto-traced path of the digital assets in the blockchain transaction flow, and generating a report including tracing destination summary statistics of the auto-traced path, the report including suspicious blockchain addresses. The method additionally, on condition that the report includes a suspicious blockchain address: generates an action including at least one of alerting a user of the suspicious blockchain address, alerting the user to the illicit digital asset transaction associated with the suspicious blockchain address, and suspending transactions by the suspicious blockchain address.

In one aspect, a method includes receiving blockchain transaction data from a blockchain ledger to a transaction database, the blockchain transaction data including blockchain addresses, transaction identifications, transaction timestamps, and digital assets transferred, receiving intelligence labels from a blockchain ecosystem intelligence database, where the intelligence labels include known behavioral characteristics of entities associated with the blockchain addresses, selecting a blockchain transaction flow comprising blockchain transactions associated with a digital account source address, digital account intermediate addresses, and a digital account destination address, receiving input trace parameters, where the input trace parameters include at least one of an objective directional setting, a tracing constraint, and a transaction filter based on the transaction timestamps and the digital assets transferred, applying the intelligence labels to the digital account source address, the digital account intermediate addresses, and the digital account destination address, thereby creating labeled account addresses, generating an interactive journey board of the blockchain transaction flow based on the input trace parameters, including paths of the digital assets in the blockchain transaction flow between the blockchain addresses, where at least one of one or more of the paths, and portions of paths, may be selected for the journey board by a user.

In one aspect, a computing apparatus includes a processor. The computing apparatus also includes a memory storing instructions that, when executed by the processor, configure the apparatus to receive blockchain transaction data from a blockchain ledger to a transaction database, the blockchain transaction data including blockchain addresses, transaction identifications, transaction timestamps, and digital assets transferred, receive intelligence labels from a blockchain ecosystem intelligence database, where the intelligence labels include known behavioral characteristics of entities associated with the blockchain addresses, select a blockchain transaction flow comprising blockchain transactions associated with a digital account source address, digital account intermediate addresses, a digital account destination address, and intermediate transactions, where the intermediate transactions transfer the digital assets between the digital account source address and the digital account destination address, receive input trace parameters, where the input trace parameters include at least one of an objective directional setting, a tracing constraint, and a transaction filter, the transaction filter based on the transaction timestamps and the digital assets transferred, apply the intelligence labels to the digital account source address, the digital account intermediate addresses, and the digital account destination address, thereby creating labeled account addresses, apply an artificial intelligence graph search algorithm to the blockchain transaction flow based on the input trace parameters, to determine an auto-traced path of the digital assets in the blockchain transaction flow, and generate a report including tracing destination summary statistics of the auto-traced path, the report including suspicious blockchain addresses. The method additionally, on condition that the report includes a suspicious blockchain address: generates an action including at least one of alerting a user of the suspicious blockchain address, alerting the user to the illicit digital asset transaction associated with the suspicious blockchain address, and suspending transactions by the suspicious blockchain address.

BRIEF DESCRIPTION OF THE SEVERAL VIEWS OF THE DRAWINGS

To easily identify the discussion of any particular element or act, the most significant digit or digits in a reference number refer to the figure number in which that element is first introduced.

DETAILED DESCRIPTION

Figure 1:
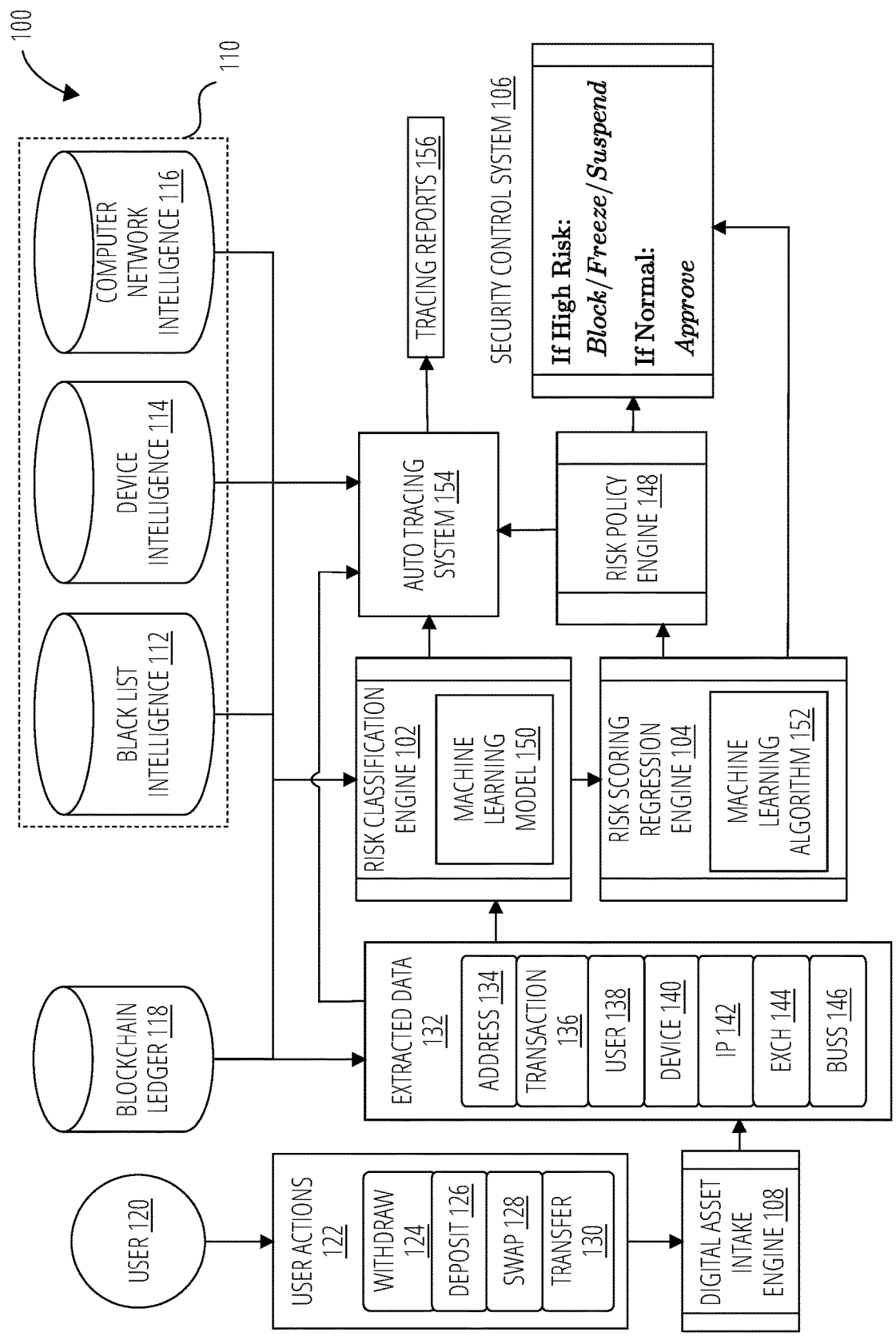
FIG. 1 illustrates a system 100 in accordance with one embodiment.

One challenge in tracing illicit cryptocurrency transactions is that the adversaries keep improving their money laundering tactics. There is no perfect solution to this problem, but artificial intelligence (AI) technology may be leveraged to improve investigators' efficiency. A system and method are disclosed to effectively and accurately trace money flow between entities, represented by digital account addresses, from data stored in a transaction database, using artificial intelligence and machine learning. Entities may be cryptocurrency addresses, cryptocurrency address clusters, fiat bank accounts, etc. Cluster analysis or clustering is the task of grouping a set of objects in such a way that objects in the same group called cluster. Cryptocurrency address clustering may involve using a mapping function to associate multiple cryptocurrency addresses with a cluster identification (ID). Applicable use cases for the disclosed solution may include but are not limited to, anti-money laundering, cybersecurity blockchain forensics, investigation, and fraud detection.

An exemplary system for tracing money flow may include one or more of the following components:

- a database system that may collect and extract, transform, and load (ETL) large volumes of transaction data, e.g., from a blockchain ledger;
- a machine learning model to predict behaviors from transaction data into a cryptocurrency mixer, exchange, etc. (these predicted categories may be augmented into the database);
- Automated Tracing (auto tracing): an Artificial Intelligence system that may trace down the money flow with set parameters and constraints for tracing, such as time range, number of hops or intermediate transactions, minimum amount to trace, etc.;
- a manual interactive system that allows more customized tracing and investigation; and
- real world entity information such as office geolocation, phone number, and email that may be associated with the traced address.

Auto tracing may be much more effective than conventional tracing techniques, especially when investigating complex blockchain and fiat money networks. Auto tracing may perform comprehensive, accurate searches in situations where manual searches may fail to detect sophisticated money laundering paths. Machine learning used in auto tracing may predict the behavior categories of each address based on transaction history, and may thus provide comprehensive insights into the characteristics behind each address.

Blockchain transaction risk management using machine learning supports the above-disclosed system and method. The risk management machine learning model may generate real time predictions allowing a suspicious cryptocurrency transfer transaction from the user to an unknown wallet address that has observed strong linkage with a known terrorist to be suspended. The system and method can detect suspicious behaviors based on historic transactions such as frequent attempts to exploit the blockchain systems, which will generate a high risk score to block this transaction.

Monitoring decentralized systems such as a blockchains may be difficult due to their nature. As the monetary value of the digital assets increases, the need to identify suspicious transactions becomes more important to ensure an exchange is not being used for money laundering or financing terrorism. The systems and methods in this disclosure allow for regulatory compliance on Anti-Money Laundering, and Counter Terrorism Financing (AML/CFT) by identifying risky transactions associated with a cryptocurrency exchange to block the transaction, as well as freeze or suspend the accounts.

Existing applications such as blacklisted blockchain addresses or sanctioned terrorists' personal information lack adaptability to newly emerging risks. By leveraging machine learning to analyze the behaviors, combining on-blockchain and off-blockchain data sources, the methods and systems of this disclosure may be more accurate, have higher coverage, and may be more preventive.

A method of operating a risk management system for blockchain digital assets involves receiving digital on blockchain information and digital off blockchain information, wherein the receiving includes a digital asset intake engine. The method involves extracting digital data from the digital on blockchain information and the digital off blockchain information. In the method, an entity knowledge base contextualizes relationships based on the digital data and the digital off blockchain information and the digital on blockchain information. A risk classification engine including a machine learning model, analyzes the digital data and transforms the digital data to an identified behavior category, thereby creating classified risk data. A risk scoring regression engine with machine learning analyzes the classified risk data and assigns a risk score to each classified risk data. A risk policy engine analyzes the classified risk data and determines if any deviations from rules or standards have or will occur, wherein the risk policy engine is a rules based engine. A security control system takes an action on the digital on blockchain information and digital off blockchain information based on the assigned risk score and any deviations from rules or standards. The action includes a security control system, where on condition the risk score is high, the action at least one of blocks a blockchain transaction, freezes user assets, or suspends user accounts related to the blockchain transaction. On condition the risk score is normal, the action approves the blockchain transaction.

In some configurations, the digital on blockchain information and digital off blockchain information include blockchain address, transaction identification, user information, device information, device IP address, business type, and exchange or custodian determination. Custodians are third-parties that store digital assets for users.

In some configurations, the entity knowledge base includes a blacklist intelligence database, a device intelligence database, a computer network intelligence database, and a blockchain ledger.

In some configurations, the risk classification engine includes a decision tree classification model.

In some configurations the machine learning model includes at least one of a machine learning classification model and a risk score model to calculate the risk score.

In some configurations, the machine learning classification model is an AutoML model. The operation of the AutoML model involves preparing a labeled dataset, pre-processing the labeled dataset, extracting AutoML features, transforming AutoML features, training an AutoML model, evaluating metrics of the AutoML model, selecting a best machine learning model using an automated selection process, and serializing the best machine learning model.

In some configurations, the AutoML model may be utilized as an offline training pipeline or an online prediction pipeline in the cloud or a decentralized blockchain node. The offline training pipeline may involve feature extraction and transformation, parallel model training, model metric evaluation, and model selection. The online prediction pipeline may involve feature extraction and transformation, model prediction, and result formatting.

In some configurations, the machine learning classification model is a behavior based model and may involve recognizing behavioral characteristics in at least one feature category for an entity. These feature categories include a statistics feature category, a topology feature category, a temporal feature category, a temporal feature category, a linkage feature category, a derived feature category, a sequential feature category. The machine learning classification model may also identify exchange behavioral wallet addresses using exchange behavior characteristics, a money laundering behavioral address, a bot behavioral address, and a bad actor group cluster.

In some configurations, the machine learning classification model is a regression model for the risk score. The regression model may include input features comprising at least one of a blockchain transaction and an external information related to blockchain addresses. The regression model may also include parameters including a time decaying factor lambda. The regression model may also include an output including risk score of the address, reasons for the prediction, and a suspicious transaction summary.

A risk management system for blockchain digital assets comprises a digital asset intake engine, an entity knowledge base engine, a risk classification engine, a risk scoring regression engine, a risk policy engine, and a security control system. The digital asset intake engine is configured to receive digital on blockchain information and digital off blockchain information, and extract digital data from the digital on blockchain information and the digital off blockchain information. The entity knowledge base engine is configured to contextualize relationships based on the digital data and the digital off blockchain information and the digital on blockchain information. The risk classification engine includes a machine learning model and is configured to analyze the digital data and transform the digital data to an identified behavior category, thereby creating classified risk data. The risk scoring regression engine includes machine learning and is configured to analyze the classified risk data and assign a risk score to each classified risk data. The risk policy engine is a rules based engine. The security control system is configured to take an action on the digital on blockchain information and digital off blockchain information based on the assigned risk score. The action by the security control system includes, on condition the risk score is high, at least one of blocking a blockchain transaction, freezing user assets, or suspending user accounts related to the blockchain transaction. On condition the risk score is normal, the action approves the blockchain transaction.

In some configurations, the digital asset intake engine includes blockchain address, transaction identification, user information, device information, device IP address, business type, exchange or custodian.

In some configurations, the entity knowledge base includes a blacklist intelligence database, a device intelligence database, a computer network intelligence database, and a blockchain ledger.

In some configurations, the knowledge base engine updates the information upon receiving threat intelligence to include a reentrancy vulnerability pattern.

In some configurations, the risk classification engine includes a decision tree classification model.

In some configurations, the risk scoring regression engine includes a machine learning classification model and a risk score model to calculate the risk score.

In some configurations, the machine learning model includes at least one of a machine learning classification model and a risk score model to calculate the risk score.

In some configurations, the machine learning classification model is an AutoML model involves preparing a labeled dataset, pre-processing the labeled dataset, extracting AutoML features, transforming AutoML features, training an AutoML model, evaluating metrics of the AutoML model, selecting a best machine learning model using an automated selection process, and serializing the best machine learning model.

In some configurations, the AutoML model is at least one of an offline training pipeline or an online prediction pipeline in the cloud or a decentralized blockchain node. The offline training pipeline involves feature extraction and transformation, parallel model training, model metric evaluation, and model selection. The online prediction pipeline involves feature extraction and transformation, model prediction, and result formatting.

In some configurations, machine learning classification model is a behavior based model comprising recognizing behavioral characteristics in at least one feature category for an entity and identifying a set of behaviors. The feature categories include a statistics feature category, a topology feature category, a temporal feature category, a temporal feature category, a linkage feature category, a derived feature category, and a sequential feature category. The set of behaviors includes exchange behavioral wallet addresses using exchange behavior characteristics, a money laundering behavioral address, a bot behavioral address, and a bad actor group cluster.

In some configurations, the machine learning classification model is a regression model for the risk score. The regression model includes input features comprising at least one of blockchain transaction and external information related to blockchain addresses. The regression model includes parameters including a time decaying factor lambda. The regression model includes outputs such as risk score of the address, reasons for the prediction, and suspicious transaction summary.

Different blockchains may be supported by this solution, including Bitcoin, Ethereum, Monero, etc. One natural extension of this solution may be investigating between multiple currencies in the same setting, such as:

Cryptocurrency+US Dollar tracing:
  Bitcoin Address 1→ . . . →Bitcoin Address N→Cryptocurrency exchange→US dollar→Tom's account at Bank A→Jerry's account at Bank A Cryptocurrency exchange plays an important role in connecting crypto currencies with fiat money. Most crypto currencies exchanges are need to have customer Know Your Customer (KYC) regulations, conceptually, by maintaining a database to map the crypto currency address to a real world identity, such as shown in the table below.

| Cryptocurrency Address | Customer Name KYC | Customer Bank Account (USD) |
|---|---|---|
| Bitcoin N | Tom | 1234 at Bank A |
| Bitcoin X | Catherine | 5678 at Bank B |
| Bitcoin Y | Adam | 9877 at Bank C |
| Ethereum E | Victor | 7777 at Bank D |

With such KYC address mapping at the crypto exchange, the disclosed solution can now trace down the US Dollar through the banking system.

FIG. 1 illustrates a system 100 for blockchain transaction risk management. The system 100 comprises a digital asset intake engine 108, a risk classification engine 102, a risk scoring regression engine 104, a risk policy engine 148, a security control system 106, an entity knowledge base engine 110, and a blockchain ledger 118. The risk classification engine 102 comprises a machine learning model 150. The risk scoring regression engine 104 comprises a machine learning algorithm 152. The entity knowledge base engine 110 comprise a black list intelligence database 112, a device intelligence database 114, a computer network intelligence database 116. The system 100 also includes an auto tracing system 154.

The digital asset intake engine 108 is configured to receive digital on blockchain information and digital off blockchain information, and extract digital data from the digital on blockchain information and the digital off blockchain information. The entity knowledge base engine 110 and blockchain ledger 118 are configured to contextualize relationships based on the digital data and the digital off blockchain information and the digital on blockchain information. The risk classification engine 102 includes a machine learning model and is configured to analyze the digital data and transform the digital data to an identified behavior category, thereby creating classified risk data. The risk scoring regression engine 104 includes machine learning and is configured to analyze the classified risk data and assign a risk score to each classified risk data.

The risk policy engine 148 is a rules based engine. The security control system 106 configured to take an action on the digital on blockchain information and digital off blockchain information based on the assigned risk score.

In the system 100, a user 120 performs a set of user actions 122 comprising a withdraw 124, a deposit 126, a swap 128, and/or a transfer 130, of funds or cryptocurrency. These actions are understood as digital on blockchain information and digital off blockchain information and are received by a digital asset intake engine 108. The digital asset intake engine 108 extracts data (extracted data 132), which pulls out the digital data and the digital off blockchain information and the digital on blockchain information that includes a blockchain address 134, a transaction identification 136, a user information 138, a device information 140, a business type 146, and a device IP address 142, as well as the exchange or custodian information 144, associated with the user 120's actions. The data pulled by the digital asset intake engine 108 may be obtained from the cryptocurrency exchange where the user actions 122 were performed or other sources that track these actions. The extracted digital data and the digital off blockchain information and the digital on blockchain information is then contextualized by a risk classification engine 102, which leverages information stored in entity knowledge bases that include the black list intelligence database 112, device intelligence database 114, and computer network intelligence database 116 of the entity knowledge base engine 110, as well as the blockchain ledger 118.

The risk classification engine 102 analyzes the information stored in the entity knowledge bases to transform the digital data into an identified behavior category, creating classified risk data. The classified risk data is then communicated to a risk scoring regression engine 104 that analyzes the classified risk data and assigns a risk score to each classified risk data. The classified risk data is then communicated to the risk policy engine 148, which is a rules based engine. The classified risk data is then analyzed by the risk policy engine 148 to determine if any deviations from rules or standards have or will occur. The security control system 106 takes an action on the digital on blockchain information and digital off blockchain information based on the assigned risk score and any deviations from rules or standards. For example, if the risk is high, the security control system 106 may block, freeze, or suspend the transaction and/or the account that is performing the actions. If the risk is viewed as normal, the security control system 106 may approve the transaction. The auto tracing system 154 may receive at least one of extracted data 132, data from the entity knowledge base engine 110, data from the risk classification engine 102, and data from the risk policy engine 148, but is not limited thereto.

Output from the risk classification engine 102, entity knowledge base engine 110, blockchain ledger 118, extracted data 132, and risk policy engine 148 may be input to the auto tracing system 154. As disclosed herein, and described in greater detail with regard to FIG. 14, the auto tracing system 154 may trace the flow of digital assets through a number of digital accounts, and may generate tracing reports 156 providing visual representations of asset flow. These tracing reports 156 may be used to assist in identifying illicit activities such as money laundering, fraud, and other activities of interest to cybersecurity blockchain forensic specialists.

Figure 2:
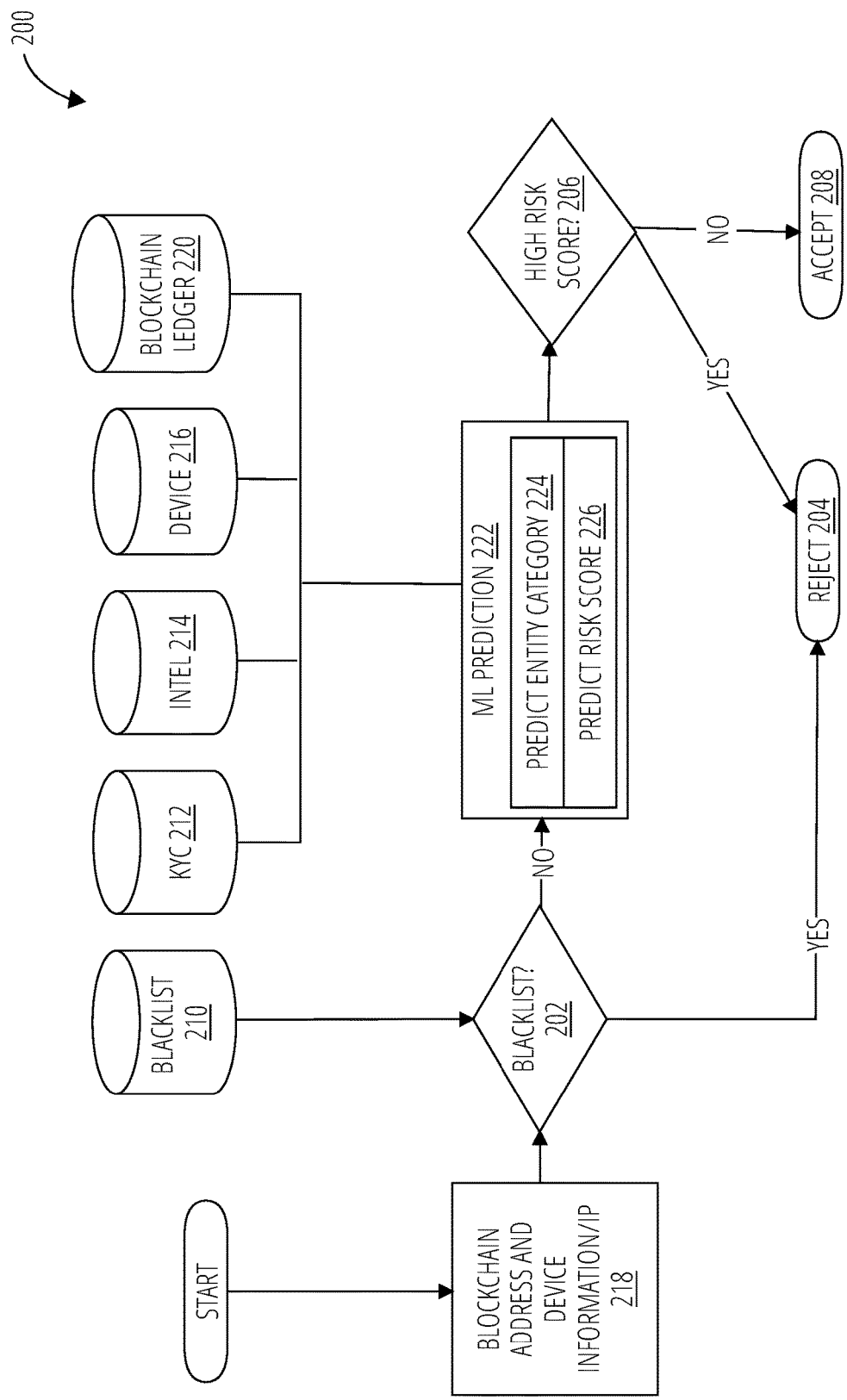
FIG. 2 illustrates a process 200 in accordance with one embodiment.

FIG. 2 illustrates a flow chart for process 200 describing machine learning (ML) Entity categorization and risk engine processes. In the process 200, blockchain address and device information/IP 218 is received following user action on the blockchain or associated with the blockchain on a cryptocurrency exchange. At decision block 202, the blockchain address and device information/IP 218 is analyzed against a blacklist database 210 and a determination is made whether the blockchain address and device information/IP 218 have been blacklisted from operating on the exchange. If the blockchain address and device information/IP 218 has been blacklisted according to the blacklist database 210, the process 200 moves to reject 204 the user action on the exchange. If the blockchain address and device information/IP 218 has not been blacklisted the process moves to block 222 where a machine learning prediction is performed. The machine learning prediction utilizes an entity knowledge base comprising an identity verification database 212, a computer network intelligence database 214, a device intelligence database 216, and the blockchain ledger 220 to predict entity category 224 and predict risk score 226. The process 200 then moves to decision block 206 that determines if the predicted risk score is high. If the risk score is high, the process 200 moves to reject 204 the user action. If the risk score is not high, the process 200 moves to accept 208 the user action.

Figure 3:
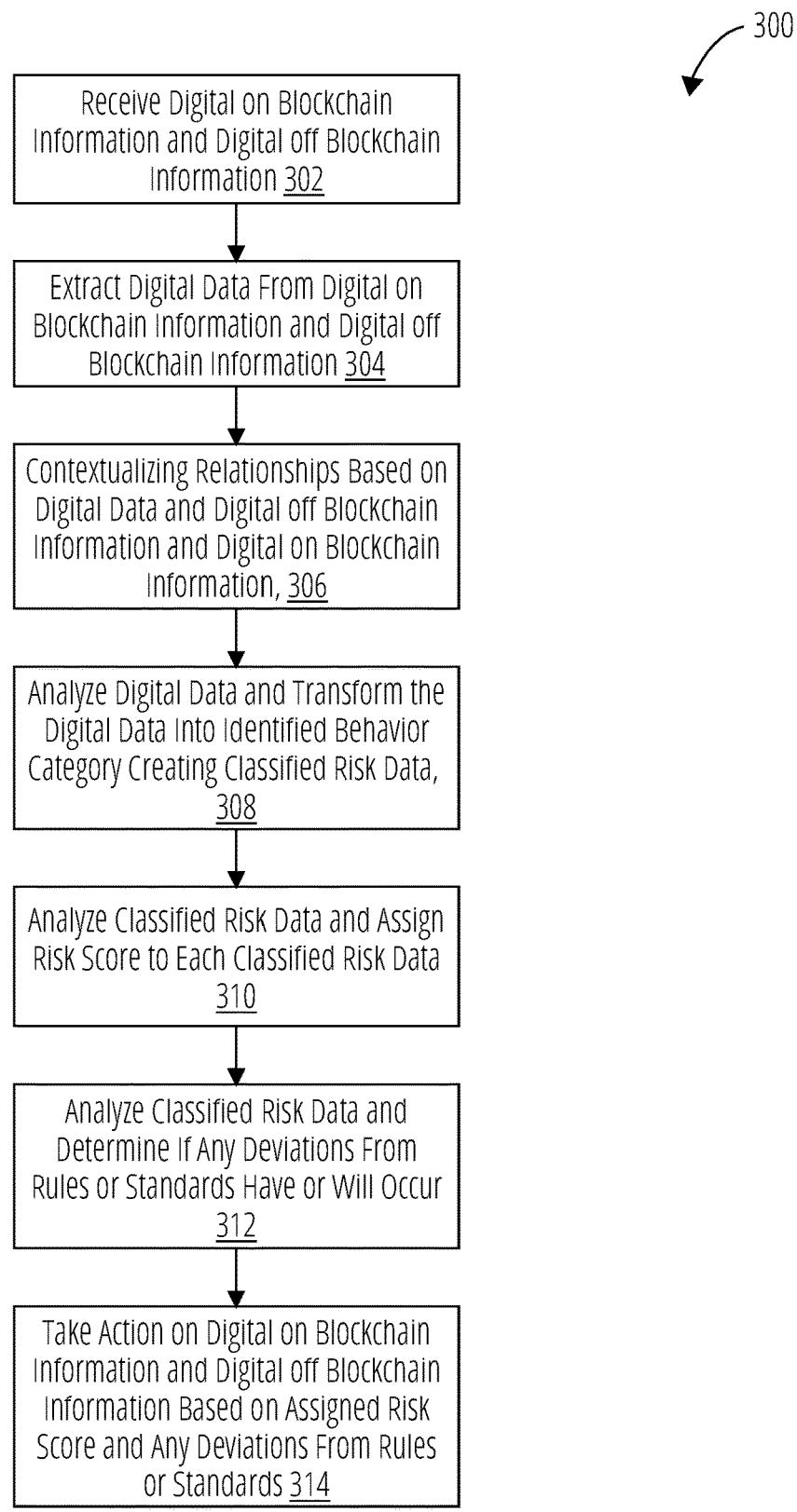
FIG. 3 illustrates a method 300 in accordance with one embodiment.

FIG. 3 illustrates a method 300 for managing risk to a block utilizing machine learning. The method 300 involves receiving digital on blockchain information and digital off blockchain information, wherein the receiving includes a digital asset intake engine (block 302). In block 304, the method 300 extracts digital data from the digital on blockchain information and the digital off blockchain information. In block 306, the method 300 contextualizes relationships based on the digital data and the digital off blockchain information and the digital on blockchain information, the contextualizing includes an entity knowledge base. In block 308, the method 300 analyzes the digital data and transforms the digital data to an identified behavior category, thereby creating classified risk data, wherein the analyzing and transforming includes a risk classification engine including a machine learning model. In block 310, the method 300 analyzes the classified risk data and assigns a risk score to each classified risk data, wherein the analyzing and assigning includes a risk scoring regression engine and machine learning. In block 312, the method 300 analyzes the classified risk data and determines if any deviations from rules or standards have or will occur, wherein the analyzing and determining includes a risk policy engine that is a rules based engine. In block 314, the method 300 takes an action on the digital on blockchain information and digital off blockchain information based on the assigned risk score and any deviations from rules or standards, wherein taking the action includes a security control system.

Figure 4:
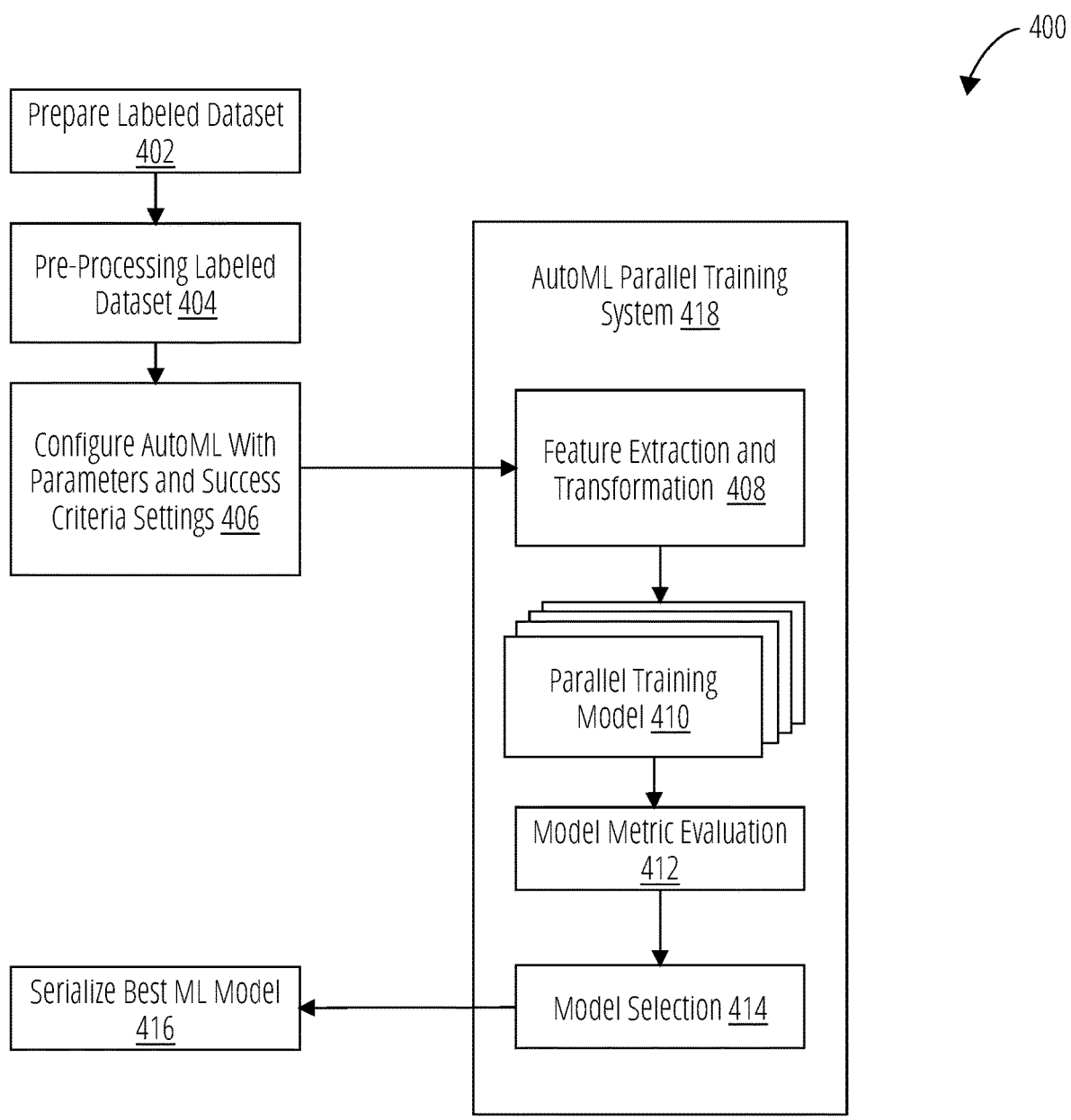
FIG. 4 illustrates method 400 in accordance with one embodiment.

FIG. 4 illustrates a method 400 for training the machine learning classification model in accordance with on embodiment. The method 400 involves preparing a labeled dataset (block 402). The in block 404, the method 400 pre-process the labeled dataset. In block 406, the method 400 configures the AutoML Parallel Training System 418 with parameters and success criteria settings. The method 400 then moves to block 408 where the AutoML features are extracted and transformed. In block 410, the method 400 trains the AutoML model. This training may occur in parallel. In block 412, the method 400 evaluates the metrics of the AutoML model. In block 414, the method 400 selects a best machine learning model using an automated selection process. In the block 416, the method 400 serializes the best machine learning model.

An example of the prepared labeled dataset may be a dataset that includes information such as: A is a hacker address with 100 transactions; B is an exchange wallet address with 2100 transactions.

Pre-processing the labeled data may involve cleaning the data, such removing null values, outliers and normalizing the data into the form for AutoML.

The AutoML parameters and criteria setting may include a computing resource setting, such as how many CPU/RAM/Disks allowed, time setting, such as how much time allowed for training the best ML model, and establishing a success criteria for the winning ML model, such as: AUC>0.99? Precision>95%.

An example of the AutoML feature extraction may be performing a principle component analysis (PCA) for dimensionality reduction to indicate a probability of correct learning. An example of AutoML feature transformation may be a logarithm transformation.

During the AutoML Model training, the selected machine learning model will be run in parallel, and compete to meet the success criteria. The AutoML model training supports all supervised/semi-supervised machine learning models, both Classification and Regression. These models include Tree ensemble models such as Gradient Boosting Trees and Random Forest, GLM Generalized linear models, Support Vector Machines, and Deep learning models such as Convolutional Neural Nets, LSTM, RNN, etc.

During the AutoML Model metric evaluation, any machine learning quantitative evaluation metrics can be adopted. These metrics include Precision, Recall, Accuracy, AUC: Area Under ROC, and F1 scores.

During the AutoML Automated model selection may be determined by criteria of selecting the winning models. In some cases when a time out occurs, the best ML model will still be selected.

The serialization of the best ML model may be done for version control. The winning machine learning model may be selected, serialized into a file, and will thus be ready to be deployed into a prediction pipeline.

In some configurations, the AutoML model may be an offline training pipeline or an online prediction pipeline in the cloud or a decentralized blockchain node. The offline training pipeline includes feature extraction and transformation, parallel model training, model metric evaluation, and model selection. The online prediction pipeline includes feature extraction and transformation, model prediction, and result formatting.

Automated machine learning (AutoML), is a system and methodology that automates various stages of the machine learning process, such as model selection, hyperparameter optimization, etc. The AutoML system takes the labeled data as input, runs a parallel competition to select the best machine learning model that meets the success criteria, and eventually emits a serialized machine learning model that can be deployed in the prediction pipeline.

The advantage of using AutoML is mostly about efficiency. AutoML helps creates high quality ML models quickly, while using minimal data science labors.

AutoML model can be modified to operate similarly to a traditional machine learning model, by limiting the compute resources. For example, AutoML can be configured to use one CPU and train one model (say Gradient Boosting Tree) at a time, which is actually a traditional machine learning model.

Figure 5:
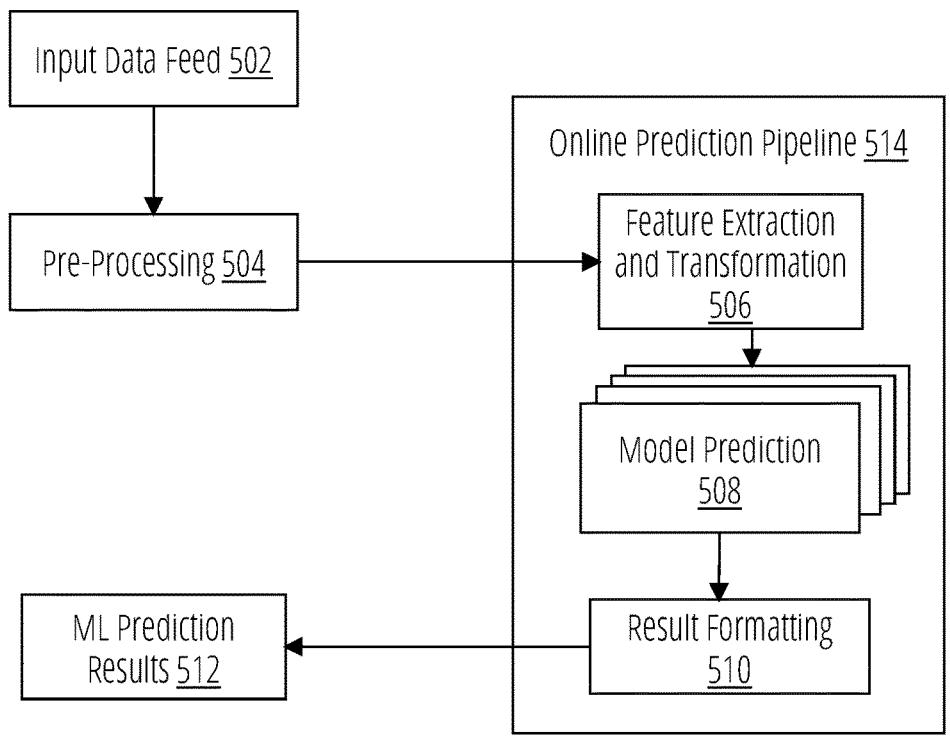
FIG. 5 illustrates method 500 in accordance with one embodiment.

FIG. 5 illustrates a method 500 for operating the AutoML model in accordance with one embodiment. The method 500 involves inputting a data feed (block 502). In block 504, the method 500 preprocess the inputs from the data feed. The preprocessing may involve cleaning the data, such removing null values, outliers and normalizing the data into the form for AutoML. The preprocessed data is then sent to the online prediction pipeline 514. The online prediction pipeline 514 is in the cloud or a decentralized blockchain node. In block 506, the method 500 performs feature extraction and transformation. An example of the AutoML feature extraction may be performing a PCA for dimensionality reduction. An example of AutoML feature transformation may be a logarithm transformation. In block 508, the method 500 performs a model prediction based on one or more models. In block 510, the method 500 formats the results. In block 512, the method 500 exports the machine learning prediction results out of the online prediction pipeline 514.

The online prediction pipeline may be deployed as a de-serialized model file, to the cloud, or through decentralized blockchain deployment. The online prediction pipeline may be utilized to perform data preprocessing, feature extraction and transformation, predictions, and generate results.

The machine learning classification model for blockchain behavioral entities may be utilized to classify a blockchain address into an entity category, based on blockchain transactions, intelligence databases, and other related info.

The machine learning classification model for blockchain behavioral entities may be applied to any blockchain behavioral entities that include crypto exchanges, crypto mixers, bots, hackers, terrorists, and smart contract based decentralized applications.

The advantage of the machine learning classification model is that it can learn from the transaction data mostly by recognizing the specific behavioral characteristics of each entity category. In contrast, the traditional methods maintain a database for addresses with known entities, which has low coverage.

The machine learning model may include feature categories for describing behavior characteristics. These categories include a statistics feature category, a topology feature category, a temporal feature category, a linkage feature category, a derived feature category, and a sequential feature category.

The statistics feature category may include items such as counts of inbound and outbound transactions, a sum of inbound and outbound amounts, maximum transaction amounts, etc.

The topology feature category may include items such as the number of input addresses, graph centrality, etc.

The temporal feature category may include items such as the number of active hours per day, the number of active Mondays in a year, the entropy of the time series range, etc.

The linkage feature category may include items such as the number of connections to known entities in the intelligence database, such as Binance exchange wallets, etc., and the amount sent to known entities, such as exchange wallets, etc.

The derived feature category may include items such as the ratio between outbound and inbound amounts, the ratio between the exchange amount and the hacker amount, etc.

The sequential feature category may include items such as the time interval between 2 consecutive transactions of one address, the percentage of transactions that have the same dollar amount within each rolling time window, etc.

The machine learning model may be utilized to identify exchange behavior addresses. A crypto exchange may have wallet addresses stored as part of their on-blockchain infrastructure. These wallets may also include designations categorizing them as cold or hot deposit wallets. Each cryptocurrency exchange may have different characteristics for making these classifications. Through the use of the machine learning model, predictions can be made to determine and identify exchange behaviors and characteristics associated with the addresses. These exchange behaviors may include a transaction funding amount that is usually large, whether hot wallets tend to be more active, generating a significant amount of transactions, whether hot wallets and cold wallets tend to cluster together, and if there are consistent temporal traits that observe high autocorrelation factors.

The machine learning model may be utilized to identify addresses associated with behaviors such as mixer, tumbler, and money laundering. The mixer, tumbler, or money laundering behavior may be characterized by the fact that most addresses are "pass through" or have "transient" behaviors, such that the funding stays in a short time interval until all the funds are wired out. Another characterization may be if there are thrown away addresses, or if they are recycled but with repetitive transient patterns. Another characterization may be identifying behavioral traits depending on the blockchain. For example, on Bitcoin there can be certain multisig patterns that can identify the mixers' encryption patterns.

The machine learning model may be utilized to identify bot behavioral addresses. Bot behavior may be characterized by their activity or their active percentage, where the more activity, the higher likelihood the that the actions are being performed by a bot. Another characterization may be done by looking at temporal regularity by auto-correlation such as if there are repeated patterns that hint at bot behavior. Another characterization may be transaction amount distribution entropy. For example, a bot is more likely to bet at a fixed amount, hence low entropy.

When the risk classification engine is informed with suspicious activities, from news or threat researchers, a seed anomaly address can be identified. For example, a group of bad actors may utilize a particular exploit, where if the machine learning model is updated with details regarding the exploit, the machine learning model may identify a cluster of addresses that benefit from the exploit and/or are associated with addresses associated with the group of bad actors.

Figure 6:
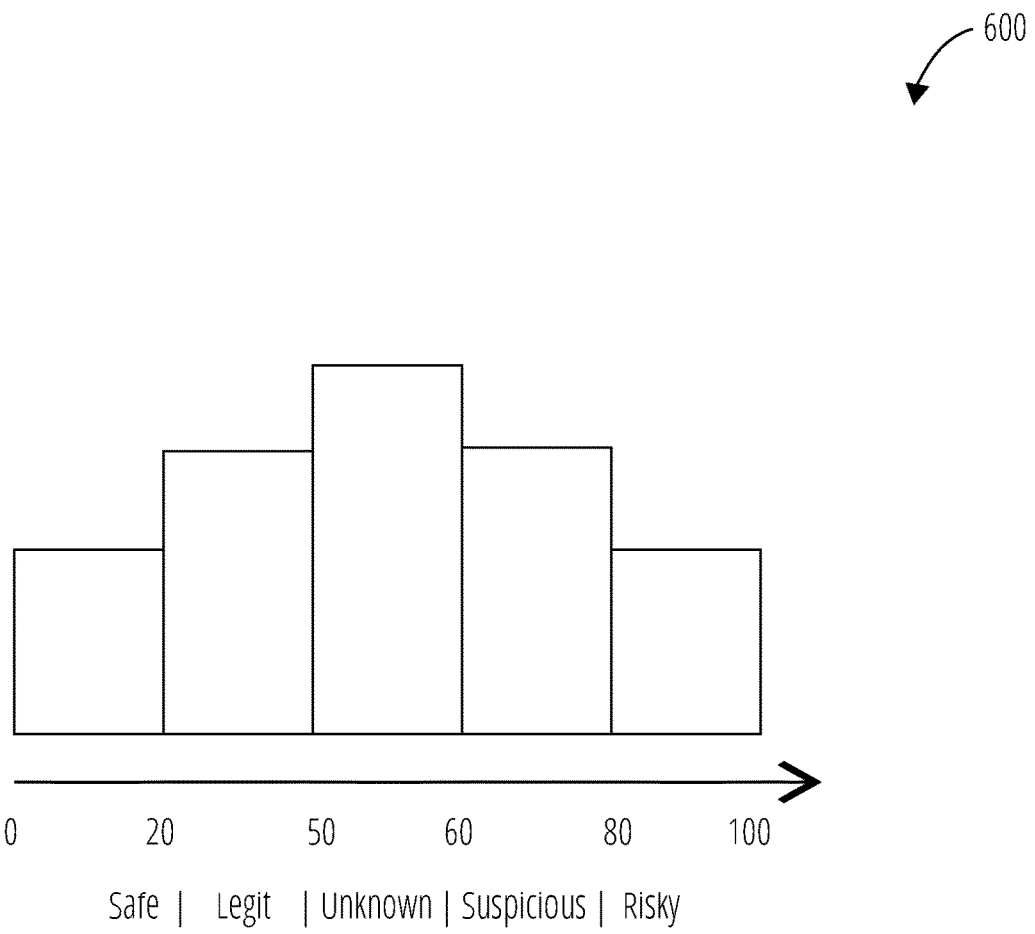
FIG. 6 illustrates a graph 600 in accordance with one embodiment.

FIG. 6 illustrates a graph 600 describing the risk score distribution. A machine learning regression model may be utilized to generate a risk score by the risk classification engine. The risk classification engine may utilize blockchain entity categorization/classification as part of the inputs to generate the risk score.

A risk score is an indicator of the risky level for an entity or event. It may also be called a reputation score. The risk score may be scored out of 100, where 100 is viewed as the highest risk entity address, and 0 as the safest entity address. The scores in between may then be bucketized into the following categories of Safe, Legitimate, Unknown, Suspicious, and Risky.

A Safe score ranges between 0-20 and describes known safe entities, such as leading compliant institutions. A Legitimate score ranges from 20-50 and describes known entities, such as medium size compliant institutions. The Unknown score ranges between 50-60 and describes new address or inactive address, and lack of observations. A Suspicious score ranges between 60-80 and is associated with identified strong ties to known risk actors. A Risky score is between 80-100 and is associated with known bad actors with direct evidence tied to terrorism, fraud, hacking, etc.

To perform the classification, a set of inputs is provided to the machine learning model. These inputs may include blockchain transaction data regarding the blockchain address, external information related to the blockchain address, such as device login IP address, geographical location, device fingerprint, etc., blockchain entity categorization from machine learning, and graph connectivity characteristic to known addresses recorded in the intelligence databases, such as hacker addresses, whitelist addresses, etc.

The machine learning model may have parameters set, such as a time decaying factor lambda. If set to 0 it means NO time decay. The expected output of the classification is the risk score for an address, the reasons for prediction—entity category, and a list of any suspicious transactions provided as a summary.

Figure 7:
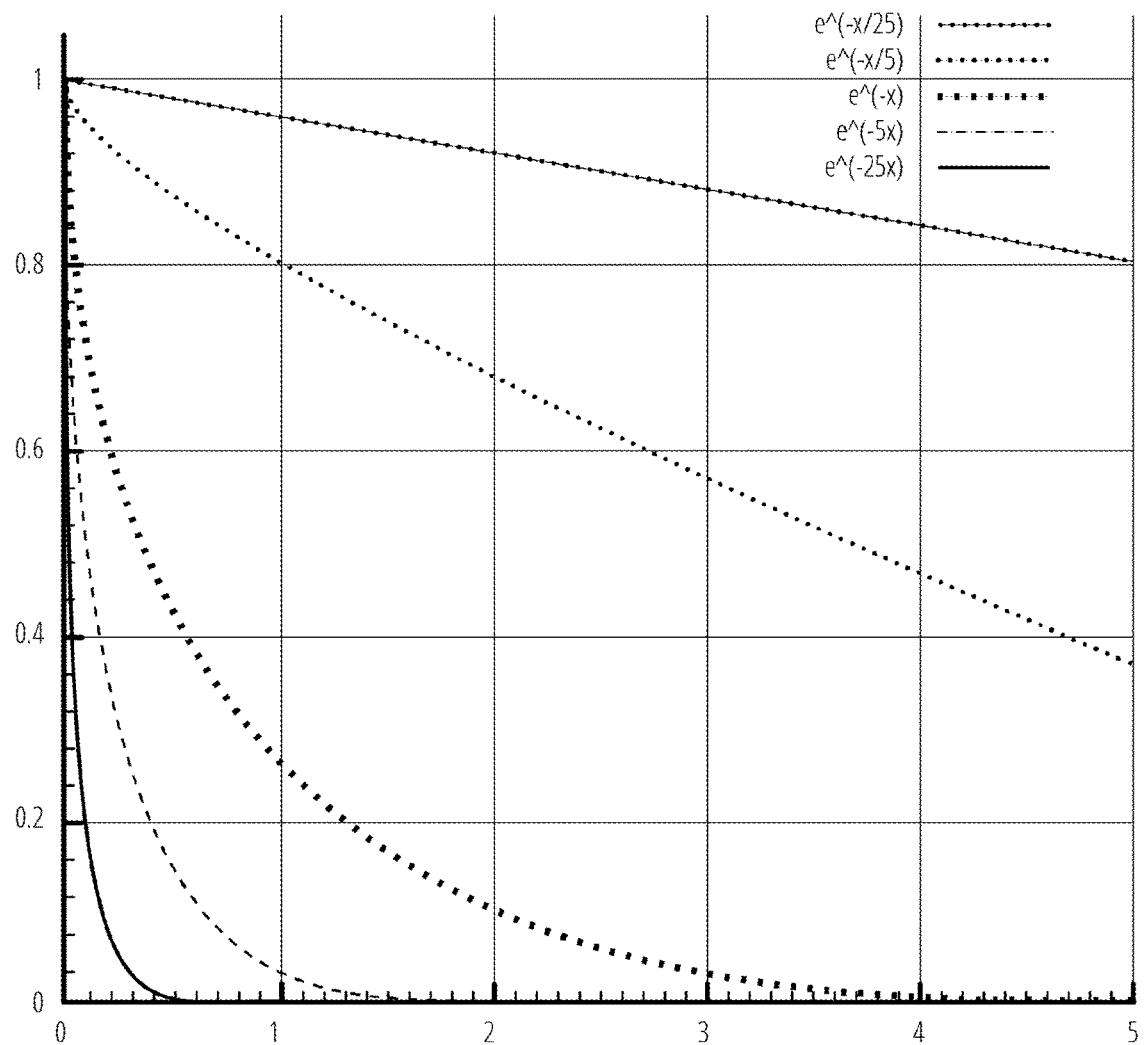
FIG. 7 illustrates a graph 700 in accordance with one embodiment.

FIG. 7 illustrates a graph 700 describing the time decaying factor for training the risk score regression model.

When training the risk score regression model, a time decaying factor may be utilized. A user may opt to configure the machine learning model such that the risk score decays as time progresses. For example, a malicious hacker address 10 years ago may have lower risk than an address established yesterday. However, the older address may still be considered risky. One way to address this issue is to implement exponential decay, where t is the time interval, and lambda is the factor controlling the speed of decaying.

$$Risk(t) = Risk(t)e^{-t\lambda}$$

An illustration of the time decay function can be seen in graph 700. Note that when lambda is set to 0, it means the time decay is disabled.

In some configurations, the machine learning model may be configured to pull additional external information to improve the results. Depending on the availability, several categories of external information that have been recorded in a financial institution's user access logs may be utilized. These categorizes of information include device login IP address, such as the device that is used by the user to access the financial institution, the geographical location, that may be based on the computer network log, a device fingerprint such as characteristics about the device, such as the browser's version, user agent string of the HTTP session, device IMEI serial number, etc., and personal information, such as passport ID, country of citizenship, etc.

In some configurations, the machine learning model may utilize graph connectivity characteristics. The machine learning model utilizing the graph connectivity characteristics may assign a high risk score based on proximity to known bad actors, such as fraud, scammers, ransomware hackers, terrorists on sanction lists, inbound/outbound fund flow, and recent time events such as recent transactions can play a bigger role than older one. An example of proximity categorization can be if the address under scrutiny is two hops from the known terrorists, with a significant inflow fund. In this case, these indicators will generate a high risk score.

In some configurations, the risk scoring regression engine may be trained with a dataset of Risky transactions (score of 100), and Safe transactions (score of 0). From this dataset, a regression model can be trained to interpolate scores from 0 to 100 based on input data.

To illustrate this the following regression function may be utilized. Note that this methodology can be also applied to nonlinear regression models, such as Gradient Boosting Trees, Support Vector Machines, Convolutional Neural Nets, etc.

$$Y_i = a + b_e X_{ei} + b_r X_{ri}$$

In the above equation,
Y is the output risk score.
$X_e$: Entity category features such as: Is it a mixer? An exchange? A Bot?
$X_r$: Risk score features such as: number of outgoing blockchain transactions, number of inbound addresses, geolocation, device type, etc.

The regression model coefficients: a, b1 (vector), and b2 (vector) can be estimated from the labeled dataset, by solving an optimization problem.

The "i" for Y, $X_e$, and $X_r$, indicates the "i-th" datapoint in the training dataset, where i ranges from 1 to n.

Figure 8:
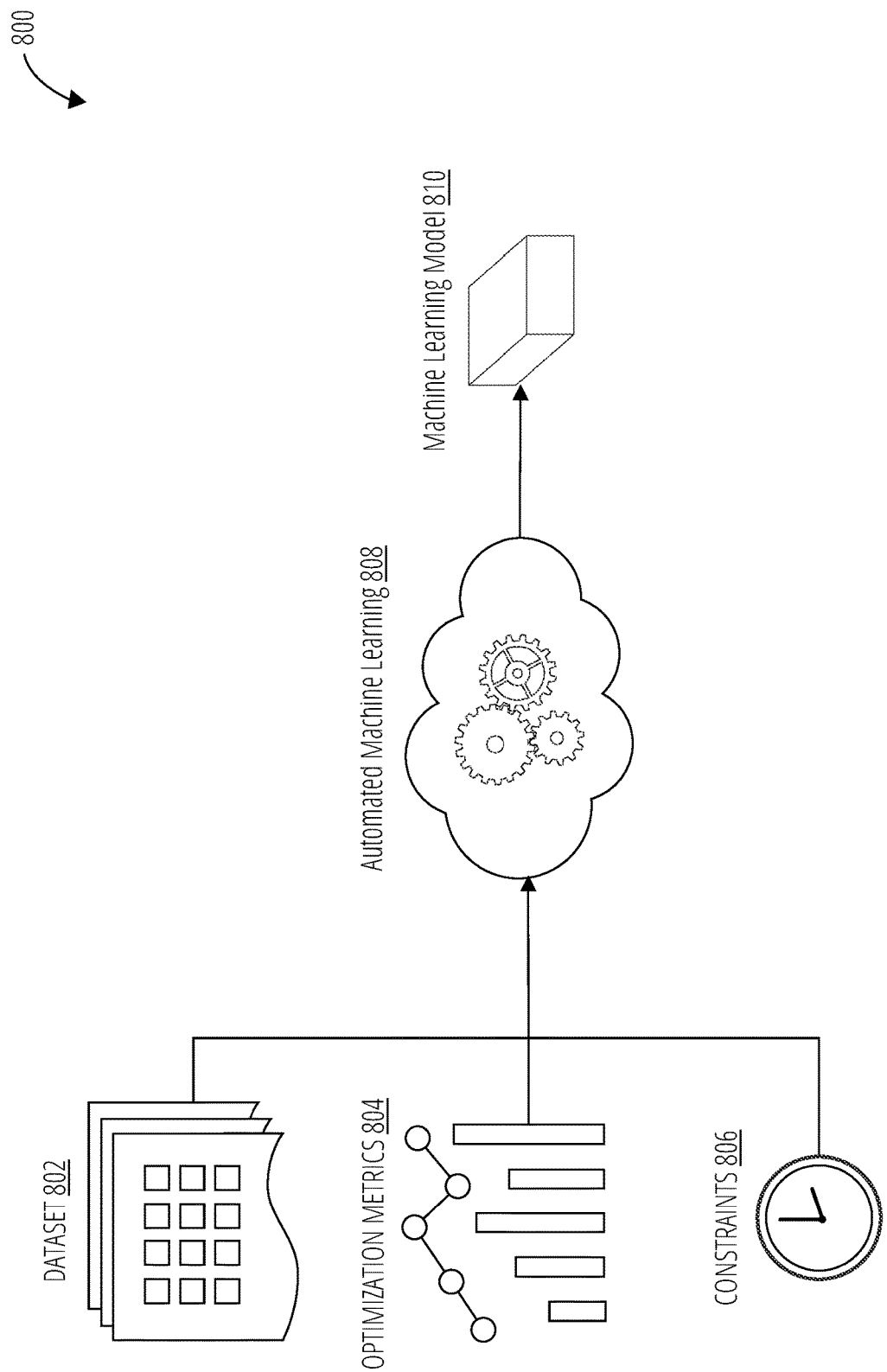
FIG. 8 illustrates an AutoML pipeline 800 in accordance with one embodiment.

FIG. 8 illustrates an AutoML pipeline 800 for selecting a machine learning model 810 utilizing Automated Machine Learning 808. For selecting a machine learning model 810, typically the three elements are provided to the Automated Machine Learning 808. These elements are the dataset 802, the optimization metrics 804, and the constraints 806. The dataset 802 is the data utilized by the user. The optimization metrics 804 are features that may be utilized to optimize the creation of model. The constraints 806 are restrictions that can be based on time or resources such as computing resources.

The AutoML pipeline is an automated process of applying the machine learning technology to an existing data modeling problem. The AutoML pipeline 800 automates the entire pipeline right from obtaining the dataset (from diverse data sources) to the development of a customized machine learning model.

In a "traditional" machine learning model, human intervention and expertise are needed at multiple stages including data ingestion, data pre-processing, and prediction models. Using AutoML, each step, other than data collection and prediction, can be automated to create a customized AutoML pipeline.

The concept was derived mainly because of the fact that applying traditional machine learning methods to real-world solutions is time consuming and often challenging even for the experts. It necessitates vast knowledge, skill, experience and professionals or experts from different disciplines.

It does so by running systematic processes on raw data and selecting models as per the relevant information of the data. It is often called the signal in the noise.

In the traditional process of machine learning, automation comes during model training, whereas, auto-machine learning is capable of automatically executing all the manual, tedious modeling tasks of data scientists. Original machine learning methods can take weeks or even month but with auto-machine learning, you can do any tasks like developing or comparing between models, making predictions from the insights, finding any pattern or solving any business problems within days.

Auto-machine learning can reduce the errors and bias that may occur because of a human who is designing the machine learning models in the first place. It also reduces the cost to an organization by avoiding the hiring of several experts as AutoML can be applied directly to the data pipeline. This concept can save the huge amount of time that is generally needed to develop or test any machine learning model.

There are two major concepts in auto-machine learning—neural architecture search and transfer learning. Neural Architecture Search is a process that can automate the design of neural networks as per the requirement. Designing these networks typically uses evolutionary algorithms or reinforcement learning. In reinforcement learning model strives to obtain higher accuracies because they get rewarded for success and are punished for failure. Already numerous research papers have been published on Efficient Neural Architecture Search (ENAS), Regularized Evolution for Image Classifier Architecture Search, and Learning Transferable Architectures for Scalable Image Recognition, and other concepts.

Transfer Learning is the concept where a pre-trained model is used to transfer its knowledge to a new model with similar datasets. This results in less power and computation time and gives high accuracies. It is the best option for any machine learning model having similar datasets to the one used for pre-trained models.

In machine learning and data science, experts are needed to tune the algorithms. To achieve the right goal, they tune several parameters. An expert's job is to fine-tune all the parameters regularly to find the desired results. AutoML can automate task selection and manipulation for aspects such as Hyperparameter Optimization, Model Selection, Feature Selection, and Pre-Trained Models.

Hyperparameter Optimization is one of the very crucial aspects of machine learning where an expert is needed to perform a hyperparameter search to achieve the right combinations in the algorithms. With AutoML, this whole process can be automated. Several libraries like Eclipse Arbiter, Google TensorFlow's Vizier or open-source Python library Spearmint allow automating hyperparameter optimization. The right combination of hyperparameters can also be found utilizing various search algorithms such as random search, Bayesian methods or grid search.

Model Selection is the process of selecting the right model for a dataset. This process can be automated through the use of AutoML. Typically, in the model selection process, an expert runs the same data through different algorithms having different hyperparameters. This process helps to determine which algorithm has the best fit for the dataset.

Feature Selection process can be automated with tools that select the most relevant features if there are pre-determined domain of inputs.

The selection or use of Pre-Trained Models can be performed by AutoML. Initially, machine learning models are dumb and with time they learn and get trained with the right data to find the pattern. The training involves models to make guesses, finding the error and then on the basis of that, correcting their guesses for making more precise predictions. In some cases, a model can be trained with any set of data and can make the right predictions on the different sets of similar data. These types of models are very useful for Computer Vision applications. Some of the well-known pre-trained models available are LeNet, VGG16, YOLO, AlexNet & Inception.

Auto-Keras

Auto-Keras is a widely used library that is used for auto-machine learning. Auto-Keras is also open-source and free to use a library that was developed by DATA Lab at Texas A&M University along with other community contributors. This library is known for providing functions that allow a user to automatically search the hyperparameters and architectures for deep learning models.

H20AutoML

H20AutoML is a distributed in-memory machine learning platform that is known for scalability. It is again an open-source tool that is packed with automated machine learning modules. It can automate whole machine learning workflow including the tuning of different models and automatic training within a defined time limit. H2O.ai can also completely automate some of the most productive and challenging tasks of data science such as model ensembling, feature engineering, model tuning and model deployment.

SMAC

Sequential Model-Based Algorithm Configuration (SMAC) is a versatile AutoML tool that is used for optimizing algorithm parameters. It is highly effective for the hyperparameter optimization of algorithms related to machine learning.

Auto-Sklearn

Auto-sklearn is built around scikit-learn library for machine learning and provides out of the box supervised machine learning solutions. It is capable of searching the best algorithms for any data set and then can optimize the hyperparameters.

Amazon Lex

Amazon Lex is a tool that can enable users to build applications such as lifelike conversational interactions and highly engaging user experiences. It can provide the functionalities of advanced deep learning like speech to text conversion or automatic speech recognition or natural language understanding. Amazon Alexa is also built around Amazon Lex with which all the developers can easily and quickly build natural language, sophisticated and conversational bots.

Auto-WEKA

Auto-WEKA is a tool that is capable of simultaneously choosing the right algorithm for a data set and can set its hyperparameters by using a fully automated approach. It leverages all the latest innovations made in Bayesian optimization. Auto-WEKA assists non-experts to identify algorithms related to machine learning and set its hyperparameters as per the applications more effectively.

Auto-Pytorch

Auto-Pytorch is a tool that can automate the process of selecting the right architecture and setting up the hyperparameters. It uses Bayesian Optimization or BOHB and multi-fidelity optimization for searching the right settings for a particular application.

ROBO

Robust Bayesian Optimization framework or ROBO is written in Python and allows a user to add or exchange Bayesian components optimizations like different regression models or acquisition functions with ease. It comes with various regression models like Random Forests, Bayesian Neural Networks or Gaussian Processes along with different acquisition functions such as the probability of improvement, expected improvement, information gain and lower confidence.

Auto Folio

This tool is known for its usage of algorithm configuration that can optimize the performance of algorithm selection systems. It does so by determining the best selection approach and all the hyperparameters.

Flex Folio

Flex Folio is an open solver and modular architecture that can integrate with several algorithm selection approaches and techniques based on the portfolio. It is also packed with a unique framework that can combine and compare existing portfolio-based algorithm techniques and selection approaches in a unified and single framework.

A machine learning algorithm may be an off-line training engine, i.e., with the ability to estimate all parameters of a regression model with the ability to ingest feature vectors as model inputs and apply a regression model to improve its results over time. Inputs comprising a set of numeric features may be conveniently described by a feature vector. Many algorithms in machine learning need a numerical representation of objects, since such representations facilitate processing and statistical analysis. An example of reaching a two-way classification from a feature vector includes calculating the scalar product between the feature vector and a vector of weights, comparing the result with a threshold, and deciding the class based on the comparison. Algorithms for classification from a feature vector include nearest neighbor classification, neural networks, and statistical techniques such as Bayesian approaches.

Figure 9:
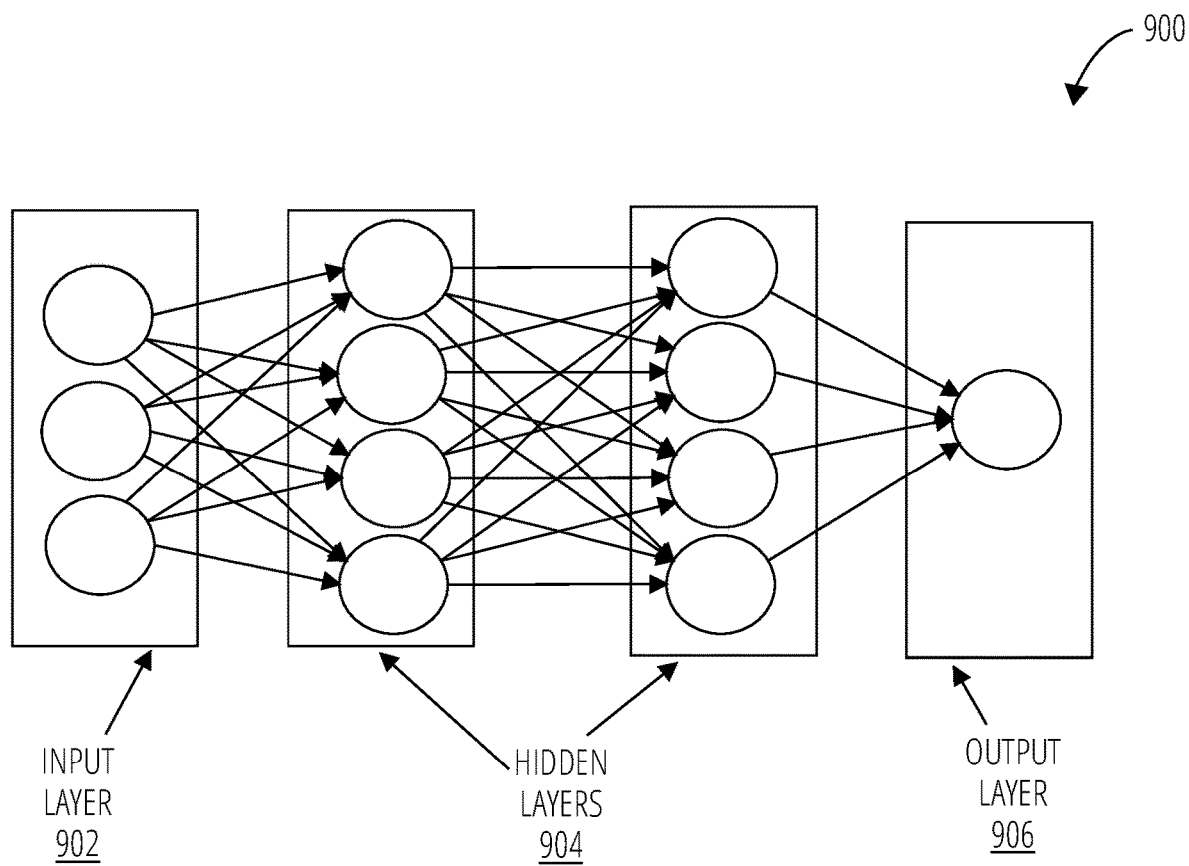
FIG. 9 illustrates a basic deep neural network 900 in accordance with one embodiment.

In some configurations, a machine learning algorithm may be implemented as a deep learning neural network. FIG. 9 illustrates a basic deep neural network 900 is based on a collection of connected units or nodes called artificial neurons which loosely model the neurons in a biological brain. Each connection, like the synapses in a biological brain, can transmit a signal from one artificial neuron to another. An artificial neuron that receives a signal can process it and then signal additional artificial neurons connected to it.

In common implementations, the signal at a connection between artificial neurons is a real number, and the output of each artificial neuron is computed by some non-linear function (the activation function) of the sum of its inputs. The connections between artificial neurons are called 'edges' or axons. Artificial neurons and edges typically have a weight that adjusts as learning proceeds. The weight increases or decreases the strength of the signal at a connection. Artificial neurons may have a threshold (trigger threshold) such that the signal is sent if the aggregate signal crosses that threshold. Typically, artificial neurons are aggregated into layers. Different layers may perform different kinds of transformations on their inputs. Signals travel from the first layer (the input layer 902), to the last layer (the output layer 906), possibly after traversing one or more intermediate layers, called hidden layers 904.

Figure 10:
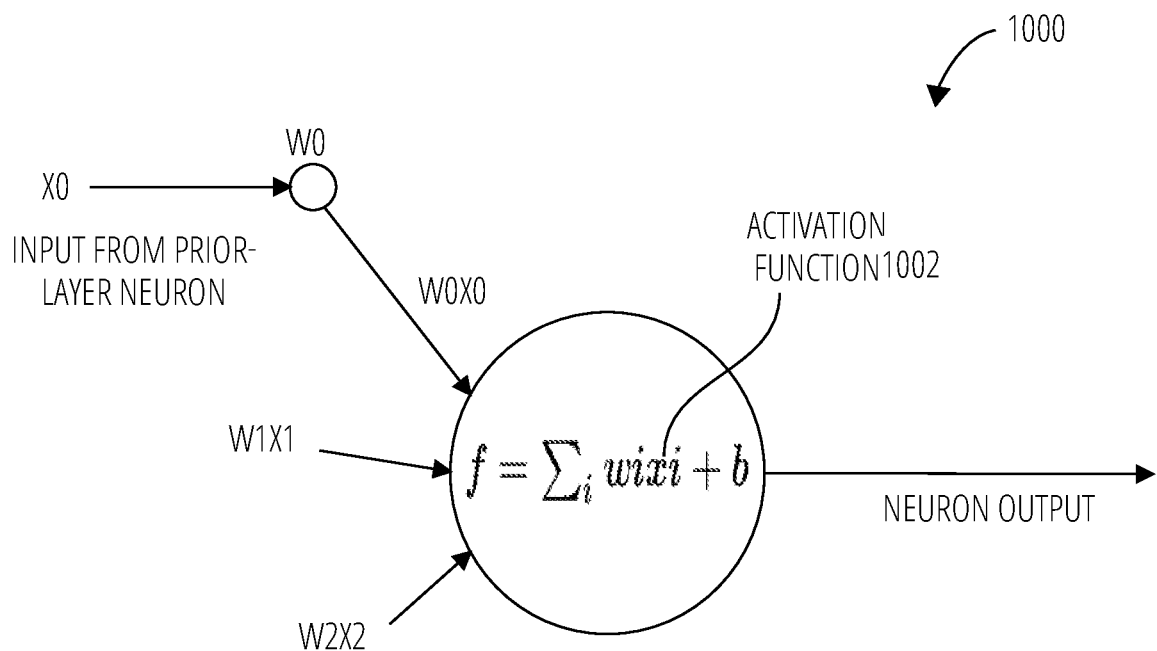
FIG. 10 illustrates an artificial neuron 1000 in accordance with one embodiment.

Referring to FIG. 10, an artificial neuron 1000 receiving inputs from predecessor neurons consists of the following components:

inputs $x_i$;

weights $w_i$ applied to the inputs;

an optional threshold (b), which stays fixed unless changed by a learning function; and an activation function 1002 that computes the output from the previous neuron inputs and threshold, if any.

An input neuron has no predecessor but serves as input interface for the whole network. Similarly, an output neuron has no successor and thus serves as output interface of the whole network.

The network includes connections, each connection transferring the output of a neuron in one layer to the input of a neuron in a next layer. Each connection carries an input x and is assigned a weight w.

The activation function 1002 often has the form of a sum of products of the weighted values of the inputs of the predecessor neurons.

The learning rule is a rule or an algorithm which modifies the parameters of the neural network, in order for a given input to the network to produce a favored output. This learning process typically involves modifying the weights and thresholds of the neurons and connections within the network.

Decision tree algorithms belong to the family of supervised learning algorithms. Unlike other supervised learning algorithms, decision tree algorithms can be used for solving regression and classification problems.

A general motive for using decision tree learning is to create a training model which can be used to predict class or value of target variables by learning decision rules inferred from prior data (training data).

Decision tree learning is one of the predictive modelling approaches used in statistics, data mining and machine learning. It uses a decision tree (as a predictive model) to go from observations about an item (represented in the branches) to conclusions about the item's target value (represented in the leaves). Tree models where the target variable can take a discrete set of values are called classification trees. In these tree structures, leaves represent class labels and branches represent conjunctions of features that lead to those class labels. Decision trees where the target variable can take continuous values (typically real numbers) are called regression trees. Decision trees are among the most popular machine learning algorithms given their intelligibility and simplicity.

Figure 11:
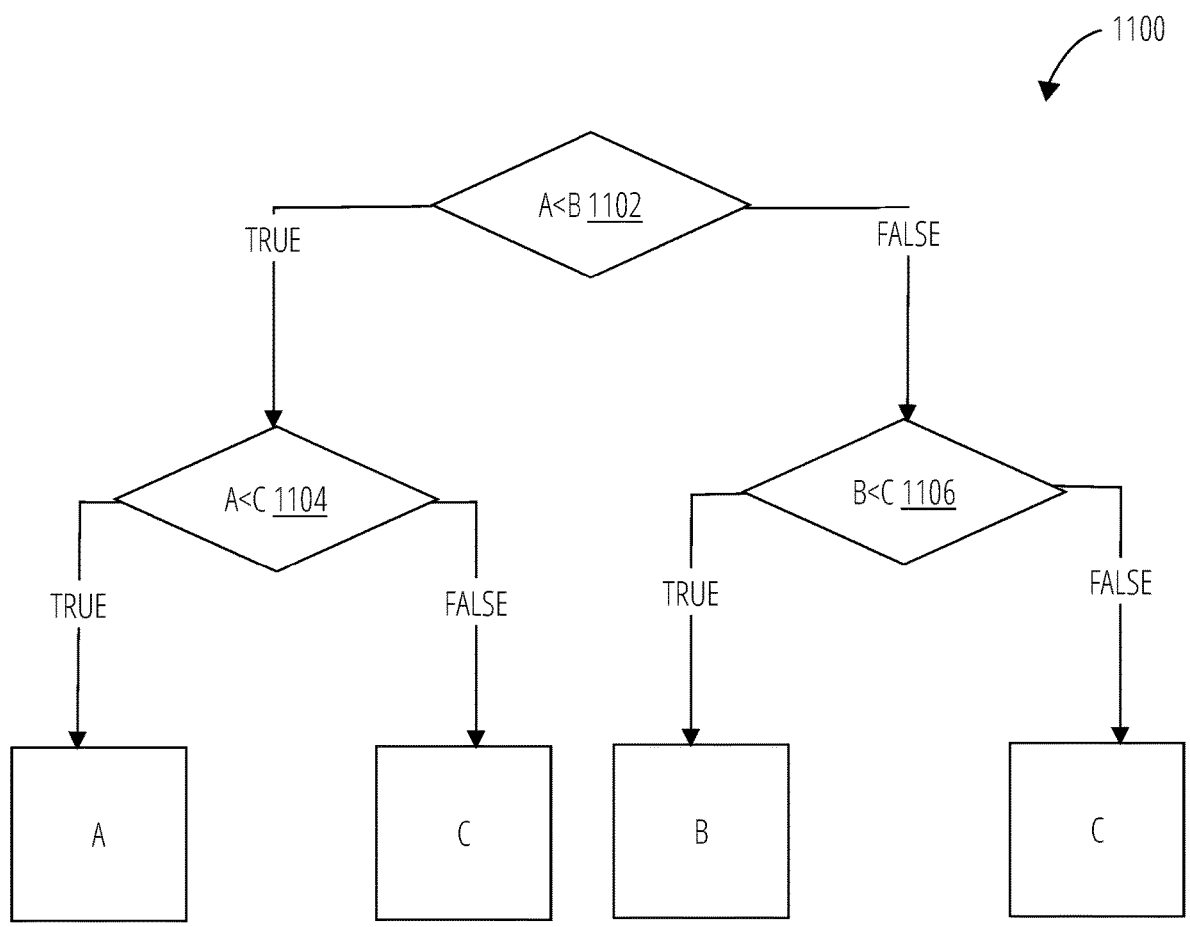
FIG. 11 illustrates a decision tree 1100 in accordance with one embodiment.

FIG. 11 illustrates an example decision tree 1100. The decision tree 1100 is shown with decision blocks representing nodes that branch based on the truth or falsity of statement in the decision node. In the decision tree 1100, the decision block 1102 makes the statement that "A<B", if this statement is true the decision branch is followed to decision block 1104 or decision block 1106 if the statement is false. If the statement was true, decision block 1104 presents the statement "A<C" which branches into end nodes ending with either A, if the statement is true, or C, if the statement is false. Similarly, if the statement was false, the decision block 1106 presents the statement "B<C" which branches into end nodes ending with either B, if the decision is true, or C, if the statement is false.

In decision analysis, a decision tree can be used to visually and explicitly represent decisions and decision making. In data mining, a decision tree describes data (but the resulting classification tree can be an input for decision making). The goal is to create a model that predicts the value of a target variable based on several input variables.

A decision tree is a simple representation for classifying examples. For this example, assume that all of the input features have finite discrete domains, and there is a single target feature called the "classification." Each element of the domain of the classification is called a class. A decision tree or a classification tree is a tree in which each internal (non-leaf) node is labeled with an input feature. The arcs coming from a node labeled with an input feature are labeled with each of the possible values of the target feature or the arc leads to a subordinate decision node on a different input feature. Each leaf of the tree is labeled with a class or a probability distribution over the classes, signifying that the data set has been classified by the tree into either a specific class, or into a particular probability distribution (which, if the decision tree is well-constructed, is skewed towards certain subsets of classes).

A tree is built by splitting the source set, constituting the root node of the tree, into subsets—which constitute the successor children. The splitting is based on a set of splitting rules based on classification features. This process is repeated on each derived subset in a recursive manner called recursive partitioning. The recursion is completed when the subset at a node has all the same values of the target variable, or when splitting no longer adds value to the predictions. This process of top-down induction of decision trees (TDIDT) is an example of a greedy algorithm, and it is by far the most common strategy for learning decision trees from data.

In data mining, decision trees can be described also as the combination of mathematical and computational techniques to aid the description, categorization and generalization of a given set of data.

Data comes in records of the form:

$$(\mathbf{X}, Y) = (x_1, x_2, x_3, \ldots, x_k, Y)$$

The dependent variable, Y, is the target variable that one is trying to understand, classify or generalize. The vector $\mathbf{x}$ is composed of the features, $x_1$, $x_2$, $x_3$, etc., that are used for that task.

There are many types of decision trees that may be utilized that vary depending on their purpose. In data mining, there are of two main types of decision trees, a classification tree and a regression tree. A classification tree analysis occurs where the predicted outcome is the class (discrete) to which the data belongs. A regression tree analysis occurs where the predicted outcome can be considered a real number (e.g. the price of a house, or a patient's length of stay in a hospital).

The term Classification And Regression Tree (CART) analysis is an umbrella term used to refer to both of the above procedures. Trees used for regression and trees used for classification have some similarities—but also some differences, such as the procedure used to determine where to split.

Another type of decision tree is a decision stream. Decision streams avoid the problems of data exhaustion and formation of unrepresentative data samples in decision tree nodes by merging the leaves from the same and/or different levels of predictive model structure. With an increasing of the number of samples in nodes and a reducing of the tree width, decision streams preserve statistically representative data and allow extremely deep graph architecture that can consist of hundreds of levels.

Some techniques, often called ensemble methods, construct more than one decision tree. An example of these are boosted trees and bootstrap aggregated trees. Boosted trees incrementally build an ensemble by training each new instance to emphasize the training instances previously mismodeled. A typical example is AdaBoost (i.e., Adaptive Boosting). These can be used for regression-type and classification-type problems. Bootstrap aggregated (or bagged) decision trees build multiple decision trees by repeatedly resampling training data with replacement, and voting the trees for a consensus prediction. A specific type of bootstrap aggregated decision trees is a random forest classifier.

Gradient boosting is a machine learning technique for regression and classification problems, which produces a prediction model in the form of an ensemble of weak prediction models, typically decision trees. It builds the model in a stage-wise fashion like other boosting methods do, and it generalizes them by allowing optimization of an arbitrary differentiable loss function.

In many supervised learning problems one has an output variable y and a vector of input variables x described via a joint probability distribution P(x,y). Using a training set $\{(x_1, y_1), \ldots, (x_n, y_n)\}$ of known values of x and corresponding values of y, the goal is to find an approximation $\widehat{F}(x)$ to a function F(x) that minimizes the expected value of some specified loss function L(y, F(x)):

$$\widehat{F} = \underset{F}{\operatorname{argmin}} \, \mathbb{E}_{x,y}[L(y, F(x))]$$

The gradient boosting method assumes a real-valued y and seeks an approximation $\widehat{F}(x)$ in the form of a weighted sum of functions $h_i(x)$ from some class $\mathcal{H}$, called base (or weak) learners:

$$\widehat{F}(x) = \sum_{i=1}^{M} \gamma h_i(x) + const.$$

In accordance with the empirical risk minimization principle, the method tries to find an approximation $\widehat{F}(x)$ that minimizes the average value of the loss function on the training set, i.e., minimizes the empirical risk. It does so by starting with a model, comprising a constant function $F_0(x)$, and incrementally expands it in a greedy fashion:

$$F_0(x) = \underset{\gamma}{\operatorname{argmin}} \sum_{i=1}^{n} L(y_i, \gamma),$$

$$F_m(x) = F_{m-1}(x) + \underset{h_m \in \mathcal{H}}{\operatorname{argmin}} \left[ \sum_{i=1}^{n} L(y_i, F_{m-1}(x_i) + h_m(x_i)) \right]$$

In the above equation, $h_m \in \mathcal{H}$ is a base learner function.

Unfortunately, choosing the best function h at each step for an arbitrary loss function L is a computationally infeasible optimization problem in general. Therefore, the approach is restricted to a simplified version of the problem.

The idea is to apply a steepest descent step to this minimization problem (functional gradient descent). If the continuous case is considered, i.e. where $\mathcal{H}$ is the set of arbitrary differentiable functions on $\mathbb{R}$, the model would be updated in accordance with the following equations $$F_m(x) = F_{m-1}(x) - \gamma_m \sum_{i=1}^{n} \nabla F_{m-1} L(y_i, F_{m-1}(x_i))$$

$$\gamma_m = \underset{\gamma}{\operatorname{argmin}} \sum_{i=1}^{n} L\big(y_i, F_{m-1}(x_i) - \gamma \nabla_{F_{m-1}} L(y_i, F_{m-1}(x_i))\big)$$

In the above equations, where the derivatives are taken with respect to the functions $F_i$ for $i \in \{1, \ldots, m\}$, and $\gamma_m$ is the step length. In the discrete case however, i.e. when the set $\mathcal{H}$ is finite, the candidate function h was chosen as the closest to the gradient of L for which the coefficient γ may then be calculated with the aid of line search on the above equations. Note that this approach is a heuristic and therefore doesn't yield an exact solution to the given problem, but rather an approximation.

Gradient boosting is typically used with decision trees (especially CART trees) of a fixed size as base learners. Generic gradient boosting at the m-th step would fit a decision tree $h_m(x)$ to pseudo-residuals. Let $J_m$ be the number of its leaves. The tree partitions the input space into $J_m$ disjoint regions $R_{1m}, \ldots, R_{J_m m}$ and predicts a constant value in each region. Using the indicator notation, the output of $h_m(x)$ for input x can be written as the sum:

$$h_m(x) = \sum_{j=1}^{J_m} b_{jm} 1 R_{jm}(x)$$

In the equation above, $b_{jm}$ is the value predicted in the region $R_{jm}$.

Then the coefficients $b_{jm}$ are multiplied by some value $\gamma_{jm}$, chosen using line search so as to minimize the loss function, and the model is updated as follows:

$$F_m(x) = F_{m-1}(x) + \gamma_m h_m(x),$$

$$\gamma_m = \underset{\gamma}{\operatorname{argmin}} \sum_{i=1}^{n} L(y_i, F_{m-1}(x_i) + \gamma h_m(x_i))$$

Algorithms for constructing decision trees usually work top-down, by choosing a variable at each step that best splits the set of items. Different algorithms use different metrics for measuring "best" results. These generally measure the homogeneity of the target variable within the subsets. One example of a metric is Gini impurity.

Gini impurity is utilized by the CART (classification and regression tree) algorithm for classification trees and as a measure of how often a randomly chosen element from the set would be incorrectly labeled if it was randomly labeled according to the distribution of labels in the subset. The Gini impurity can be computed by summing the probability $p$ $i$ of an item with label $i$ being chosen times the probability $$\sum_{h \neq p} p_h = 1 - p_i$$

of a mistake in categorizing that item. It reaches its minimum (zero) when all cases in the node fall into a single target category.

The Gini impurity is also an information theoretical measure and corresponds to Tsallis Entropy with deformation coefficient $q=2$, which in physics is associated with the lack of information in out-of-equilibrium, non-extensive, dissipative and quantum systems. For the limit $q \to 1$ one recovers the usual Boltzmann-Gibbs or Shannon entropy. In this sense, the Gini impurity is but a variation of the usual entropy measure for decision trees.

To compute Gini impurity for a set of items with J classes, suppose $i \in \{1, 2, \ldots, J\}$, and let $pi$ be the fraction of items labeled with class i in the set.

$$I_G(p) = \sum_{i=1}^{J} p_i \sum_{k \neq i}^{J} p_k = \sum_{i=1}^{J} p_i(1-p_i) = \sum_{i=1}^{J} (p_i - p_i^2) = \sum_{i=1}^{J} p_i - \sum_{i=1}^{J} p_i^2 = 1 - \sum_{i=1}^{J} p_i^2$$

Some of the advantages of using decisions trees are:
Ability to handle both numerical and categorical data compared to other techniques that are usually specialized in analyzing datasets that have one type of variable. (For example, relation rules are used with nominal variables while neural networks are used with numerical variables or categorical converted to 0-1 values.)

Little data preparation is needed compared to other techniques that often use data normalization. Since trees can handle qualitative predictors, there is no need to create dummy variables.

Uses a white box or open-box model. If a given situation is observable in a model the explanation for the condition is easily explained by Boolean logic. By contrast, in a black box model, the explanation for the results is typically difficult to understand, for example with an artificial neural network.

Possible to validate a model using statistical tests. That makes it possible to account for the reliability of the model.

Non-statistical approach that makes no assumptions of the training data or prediction residuals; e.g., no distributional, independence, or constant variance assumptions Performs well with large datasets. Large amounts of data can be analyzed using standard computing resources in reasonable time.

Mirrors human decision making more closely than other approaches. This may be useful when modeling human decisions/behavior.

Robust against co-linearity, particularly boosting

In built feature selection. Additional irrelevant features will be less used so that they can be removed on subsequent runs. The hierarchy of attributes in a decision tree reflects the importance of attributes. It means that the features on top are the most informative.

Decision trees can approximate any Boolean function XOR.

A regression model comprises algorithms and analysis. Regression analysis is a set of statistical processes for estimating the relationships among variables. It includes many techniques for modeling and analyzing several variables, when the focus is on the relationship between a dependent variable and one or more independent variables. More specifically, regression analysis helps one understand how the typical value of the dependent variable changes when any one of the independent variables is varied, while the other independent variables are held fixed. Regression analysis additionally estimates the conditional expectation of a dependent variable given the independent variables—that is, the average value of the dependent variable when the independent variables are fixed.

Regression is a method of modelling a target value based on independent predictors. This method is mostly utilized for forecasting and determining cause and effect relationship between variables. Regression techniques mostly differ based on the number of independent variables and the type of relationship between the independent and dependent variables.

Figure 12:
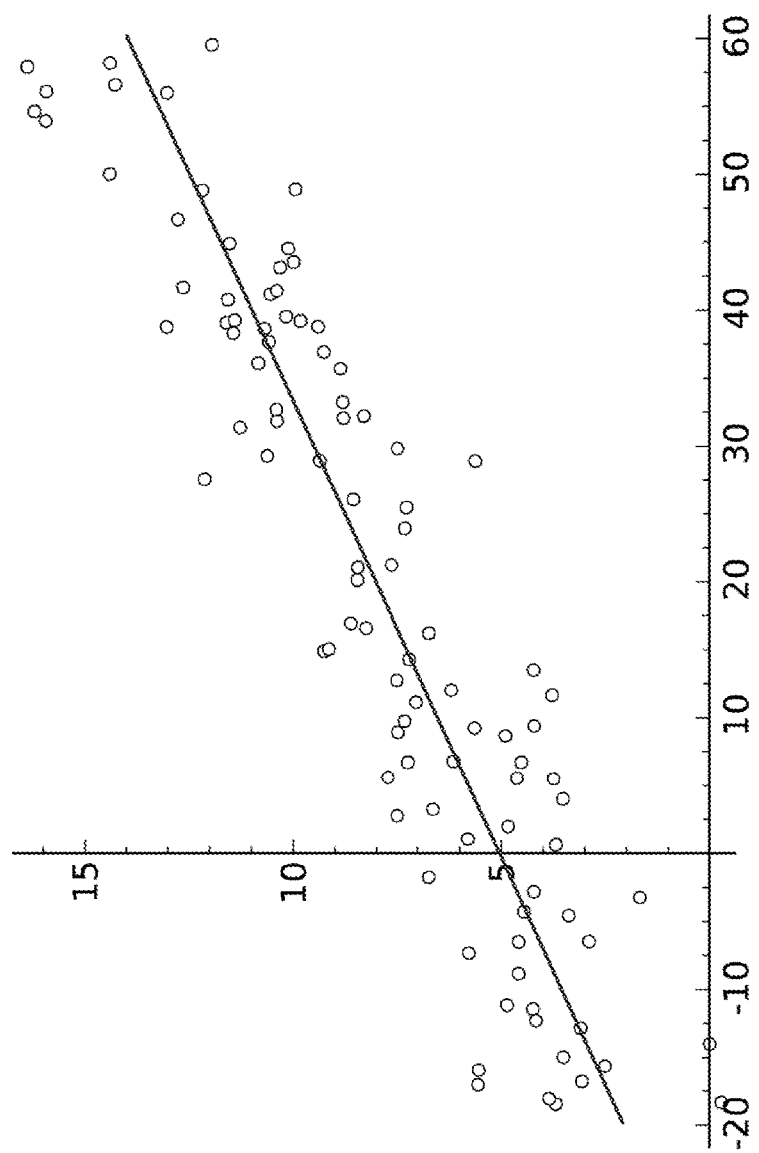
FIG. 12 illustrates a graph 1200 showing a best fit line.

Simple linear regression is a type of regression analysis where the number of independent variables is one and there is a linear relationship between the independent(x) and dependent(y) variable. Referencing FIG. 12, the line in the graph 1200 is referred to as the best fit straight line. Based on the given data points, a line is plotted that models the points the best. The line may be modelled based on the linear equation $y=\alpha_0+\alpha_1*x$.

The motive of the linear regression algorithm is to find the best values for $\alpha_0$ and $\alpha_1$.

Regression analysis includes a set of machine learning methods that allows for the prediction of a continuous outcome variable (y) based on the value of one or multiple predictor variables (x).

The goal of a regression model is to build a mathematical equation that defines y as a function of the x variables. This equation may be utilized to predict the outcome (y) on the basis of new values of the predictor variables (x).

Linear regression is a technique for predicting a continuous variable. It assumes a linear relationship between the outcome and the predictor variables.

The linear regression equation may be written as y=b0+b*x+e, where:
 b0 is the intercept,
 b is the regression weight or coefficient associated with the predictor variable x.
 e is the residual error Technically, the linear regression coefficients are determined so that the error in predicting the outcome value is minimized. This method of computing the beta coefficients is called the Ordinary Least Squares method.

When there are multiple predictor variables, say x1 and x2, the regression equation may be written as y=b0+b1*x1+b2*x2+e. In some situations, there might be an interaction effect between some predictors, that is for example, increasing the value of a predictor variable x1 may increase the effectiveness of the predictor x2 in explaining the variation in the outcome variable. Note also that, linear regression models can incorporate both continuous and categorical predictor variables.

When building a linear regression model, diagnostics are performed to determine whether linear model is suitable for a data set. In some cases, the relationship between the outcome and the predictor variables may not be linear. In these situations, a non-linear regression, such as polynomial and spline regression, may be utilized.

When there are multiple predictors in the regression model, the best combination of predictor variables may be selected to build an optimal predictive model. This process is called model selection, and includes comparing multiple models containing different sets of predictors in order to select the best performing model that minimize the prediction error. Linear model selection approaches include best subsets regression and stepwise regression In some situations, such as in genomic fields, a data set may be a large multivariate data set containing some correlated predictors. In this case, the information, in the original data set, may be summarized into few new variables (called principal components) that are a linear combination of the original variables. This few principal components may be used to build a linear model, which might be more performant for the data. This approach is known as principal component-based methods, which includes principal component regression and partial least squares regression.

An alternative method to simplify a large multivariate model is to use penalized regression, which penalizes the model for having too many variables. The most well known penalized regression includes ridge regression and the lasso regression.

Although all these different regression models can be applied to a data set, comparison of the models may be needed to select the best approach that best explains data-set. To do so, statistical metrics may be utilized to compare the performance of the different models in explaining the data set and in predicting the outcome of new test data.

The best model may be defined as the model that has the lowest prediction error. The most popular metrics for comparing regression models, include:
 Root Mean Squared Error, which measures the model prediction error. It corresponds to the average difference between the observed known values of the outcome and the predicted value by the model. RMSE is computed as RMSE=mean((observed−predicted)^2) %>% sqrt( ). The lower the RMSE, the better the model.
 Adjusted R-square, representing the proportion of variation (i.e., information), in the data set, explained by the model. This corresponds to the overall quality of the model. The higher the adjusted R2, the better the model Note that, the above mentioned metrics should be computed on a new test data that has not been used to train (i.e., build) the model. If using a large data set with many records, the data can be split into training set (80% for building the predictive model) and test set or validation set (20% for evaluating the model performance).

One of the most robust and popular approach for estimating a model performance is k-fold cross-validation. It may be applied even on a small data set. k-fold cross-validation works as follow:
 1. Randomly split the data into k-subsets (or k-fold) (for example 5 subsets)
 2. Reserve one subset and train the model on all other subsets
 3. Test the model on the reserved subset and record the prediction error
 4. Repeat this process until each of the k subsets has served as the test set.
 5. Compute the average of the k recorded errors. This is called the cross-validation error serving as the performance metric for the model.

Taken together, the best model is the model that has the lowest cross-validation error, RMSE.

Figure 13:
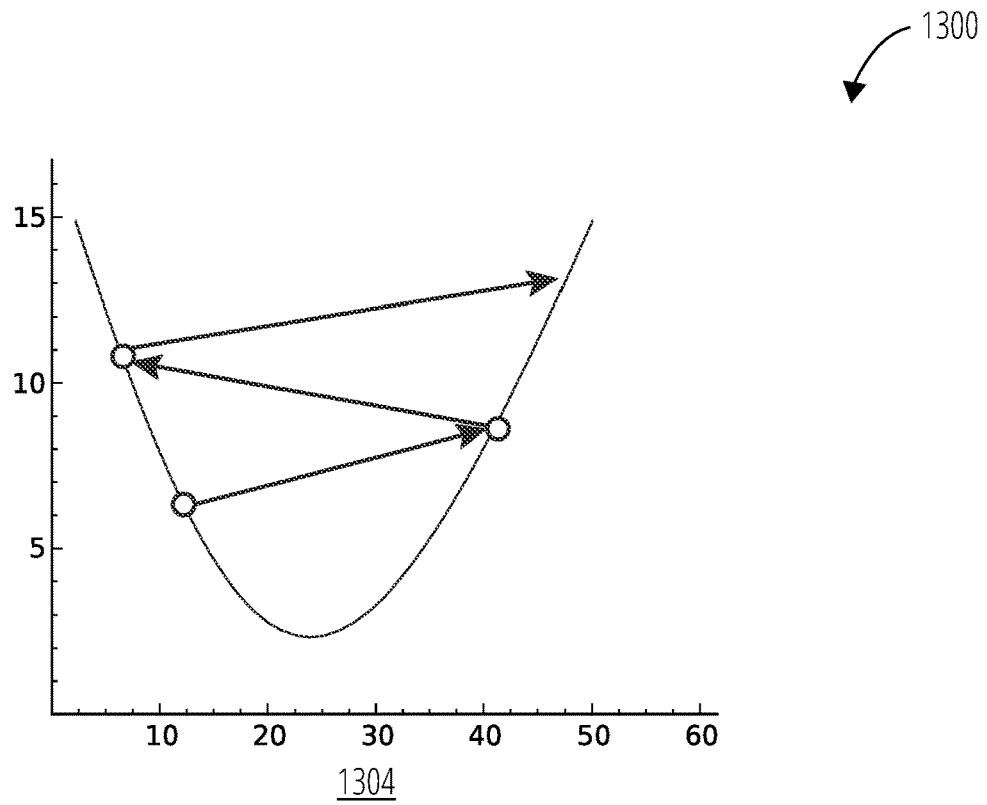
FIG. 13 displays a set of graphs 1300 as examples of different learning rates.
Figure 13:
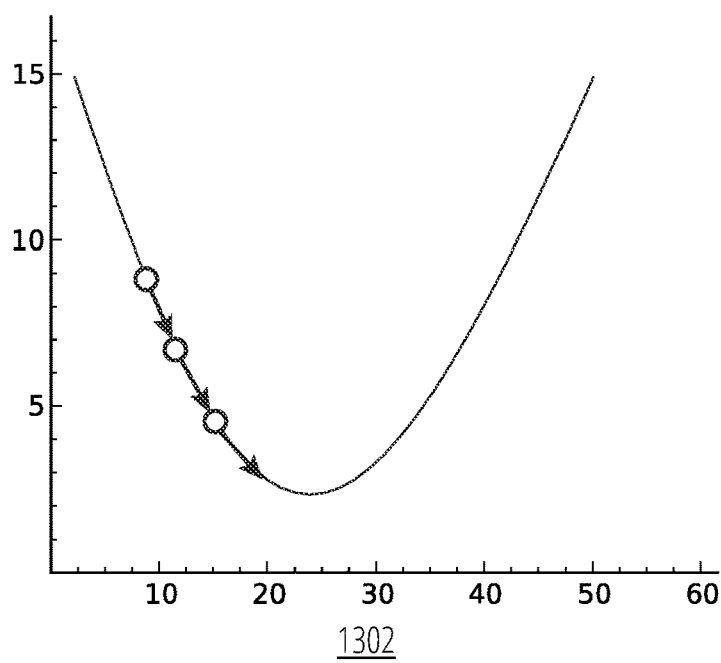

FIG. 13 illustrates a set of graphs 1300 as examples of different learning rates. To better understand linear regression the concepts of a cost function and gradient descent are explained below.

The cost function is useful for determining the best possible values for $\alpha_0$ and $\alpha_1$ which would provide the best fit line for the data points. To determine the best values for $\alpha_0$ and $\alpha_1$, the search problem is converted into a minimization problem where the objective is to minimize the error between the predicted value and the actual value.

$$\text{minimize} \frac{1}{n}\sum_{i=1}^{n}(pred_i - y_i)^2$$

$$J = \frac{1}{n}\sum_{i=1}^{n}(pred_i - y_i)^2$$

Function 1

The function above (function 1) was selected to illustrate the minimization problem. The difference between the predicted values and ground truth measures the error difference. The error difference is squared, then all data points summed up and the value is then divided by the total number of data points. This provides the average squared error over all the data points. Therefore, this cost function is also known as the Mean Squared Error (MSE) function. Utilizing this MSE function the values of $\alpha_0$ and $\alpha_1$ are changed such that the MSE value settles at the minima.

Gradient descent is a method of updating $\alpha_0$ and $\alpha_1$ to reduce the cost function (MSE). It is a process of optimizing the values of the coefficients by iteratively minimizing the error of the model on the training data. The idea is to start with some values for $\alpha_0$ and $\alpha_1$ and then change these values iteratively to reduce the cost. Gradient descent helps to determine how to change the values.

Gradient descent works by starting with random values for each coefficient. The sum of the squared errors is calculated for each pair of input and output values. A learning rate is used as a scale factor and the coefficients are updated in the direction towards minimizing the error. The process is repeated until a minimum sum squared error is achieved or no further improvement is possible.

In this method, a learning rate (alpha) parameter is selected that determines the size of the improvement step taken on each iteration of the procedure.

To draw an analogy, imagine a pit in the shape of U and someone is standing at the topmost point in the pit and his objective is to reach the bottom of the pit. There is a catch: they have to take a discrete number of steps to reach the bottom. If he decides to take one step at a time, he would eventually reach the bottom of the pit but this would take a longer time. If he chooses to take longer steps each time, he would reach sooner but, there is a chance that he could overshoot the bottom of the pit and not exactly at the bottom. In the gradient descent algorithm, the number of steps taken is the learning rate. This decides on how fast the algorithm converges to the minima. This concept is illustrated in FIG. 13 where graph 1304 illustrates a big learning rate the overshoots the minima, and graph 1302 illustrates a small learning rate as it approaches the minima.

In some situations, the cost function may be a non-convex function where there may be local minima but for linear regression, it is generally a convex function.

To update $\alpha_0$ and $\alpha_1$ utilizing gradient descent, gradients are taken from the cost function. To find these gradients, partial derivatives are taken with respect to $\alpha_0$ and $\alpha_1$. An example of how to identify the partial derivatives are found in the equations below $$J = \frac{1}{n}\sum_{i=1}^{n}(pred_i - y_i)^2$$

$$J = \frac{1}{n}\sum_{i=1}^{n}(a_0 + a_1 \cdot x_i - y_i)^2$$

$$\frac{\partial J}{\partial a_0} = \frac{2}{n}\sum_{i=1}^{n}(a_0 + a_1 \cdot x_i - y_i) \Rightarrow \frac{\partial J}{\partial a_0} = \frac{2}{n}\sum_{i=1}^{n}(pred_i - y_i)$$

$$\frac{\partial J}{\partial a_1} = \frac{2}{n}\sum_{i=1}^{n}(a_0 + a_1 \cdot x_i - y_i) \cdot x_i \Rightarrow \frac{\partial J}{\partial a_1} = \frac{2}{n}\sum_{i=1}^{n}(pred_i - y_i) \cdot x_i$$

$$a_0 = a_0 - \alpha \cdot \frac{2}{n}\sum_{i=1}^{n}(pred_i - y_i)$$

$$a_1 = a_1 - \alpha \cdot \frac{2}{n}\sum_{i=1}^{n}(pred_i - y_i) \cdot x_i$$

The partial derivates are the gradients and they are utilized to update the values of $\alpha_0$ and $\alpha_1$. Alpha is the learning rate which is a hyperparameter that a user may specify. Selecting a smaller learning rate may converge at the minima with more accurate results but at the cost of more time, while selecting a larger learning rate may converge sooner but there is a chance that to overshoot the minima.

Gradient descent is often taught using a linear regression model because it is relatively straightforward to understand. In practice, it is useful when implemented with a very large dataset either in the number of rows or the number of columns that may not fit into memory.

Auto Tracing

Figure 14:
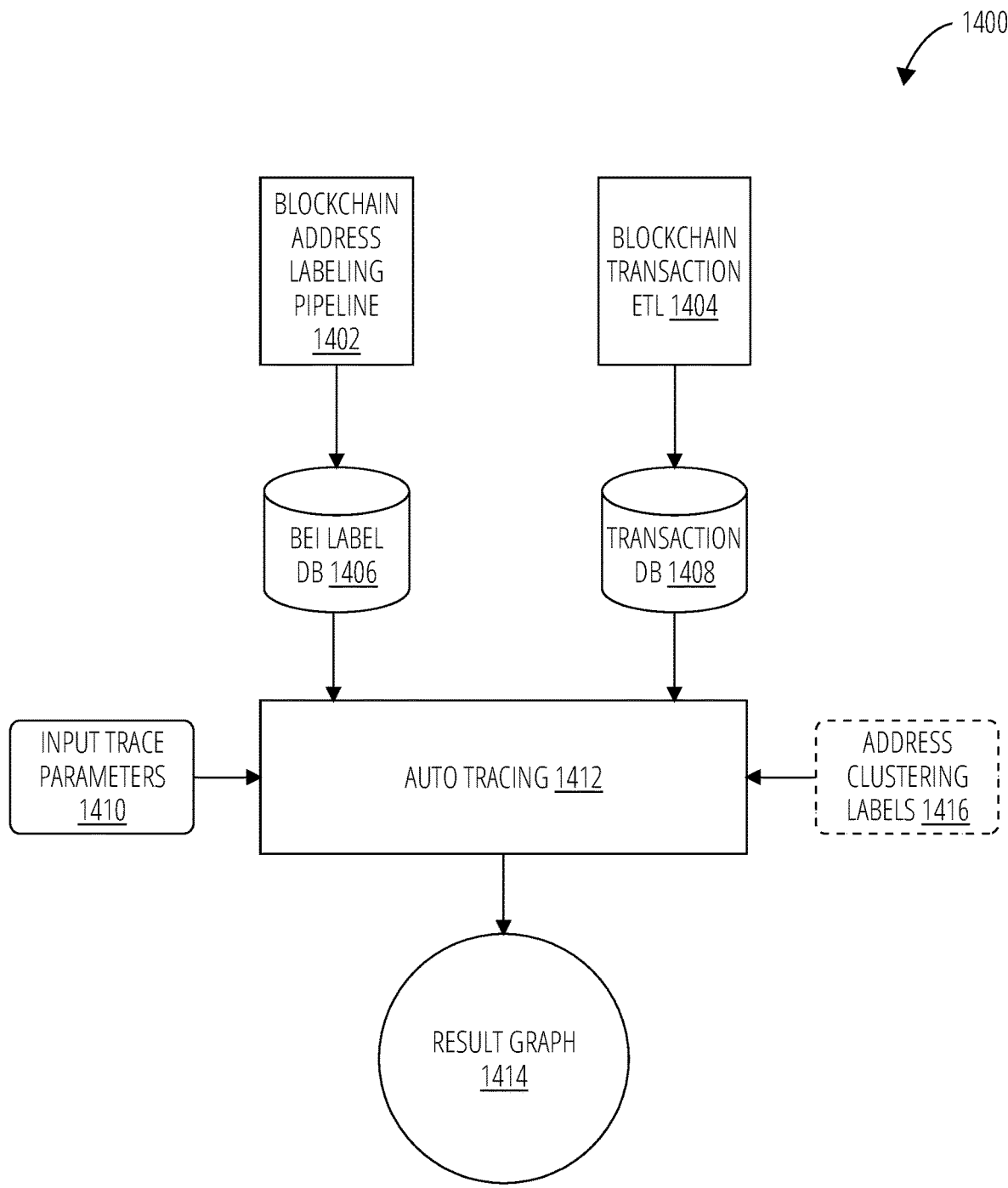
FIG. 14 illustrates a blockchain system flow block diagram 1400 in accordance with one embodiment.

FIG. 14 illustrates a blockchain system flow block diagram 1400 in accordance with one embodiment. The blockchain system flow block diagram 1400 comprises a blockchain address labeling pipeline 1402, a blockchain transaction ETL 1404, a BEI label database 1406, a transaction database 1408, input trace parameters 1410, an auto tracing 1412 system, and a result graph 1414.

The blockchain address labeling pipeline 1402 may provide address labeling for each address. Address labeling may be based on machine learning behavior analytics and intelligence database look ups. Address labeling may be provided to a Blockchain Ecosystem Intelligence (BEI) label database (BEI label database 1406) from data structures such as the entity knowledge base engine 110 introduced with respect to FIG. 1, as well as the risk classification engine 102 of FIG. 1. Transaction data for blockchain transactions may be processed by a blockchain transaction ETL 1404 and stored in a transaction database 1408. The blockchain transaction ETL 1404 may include data from the blockchain ledger 118 and/or the extracted data 132 introduced with regard to FIG. 1 above. Data from the BEI label database 1406 and transaction database 1408 may be input to a system or module performing auto tracing 1412.

The BEI label database 1406 and transaction database 1408 may be located in memory, may be key value stores, or may comprise distributed columnar databases for fast access and scalability. The number of transactions and entities may be very large, and may need fast and massive storage structures. The information associated with each transaction and/or entity may also be large. In addition to transaction data and entity data, additional data stores may be needed, including exchange rates, geolocations, phone numbers, etc.

Auto tracing 1412 may also accept as input a set of input trace parameters 1410. Input trace parameters 1410 may include a starting address, a direction of money flow, a minimum transaction volume, a start time, an end time, and a maximum number of hops across a transaction path. Input parameters may include objective settings such as backward tracing and forward tracing. Input parameters may include tracing constraints, such as whether the trace may be time-bound or time-unbound. Transaction filters may be implemented, such that the trace may, for example, include transactions of monetary amounts above a predefined threshold. In one embodiment, address clustering labels 1416 may also be input to the auto tracing 1412 system. Transaction addresses may be mapped into clusters based on geography, perceived risk, or some other metric.

Figure 16:
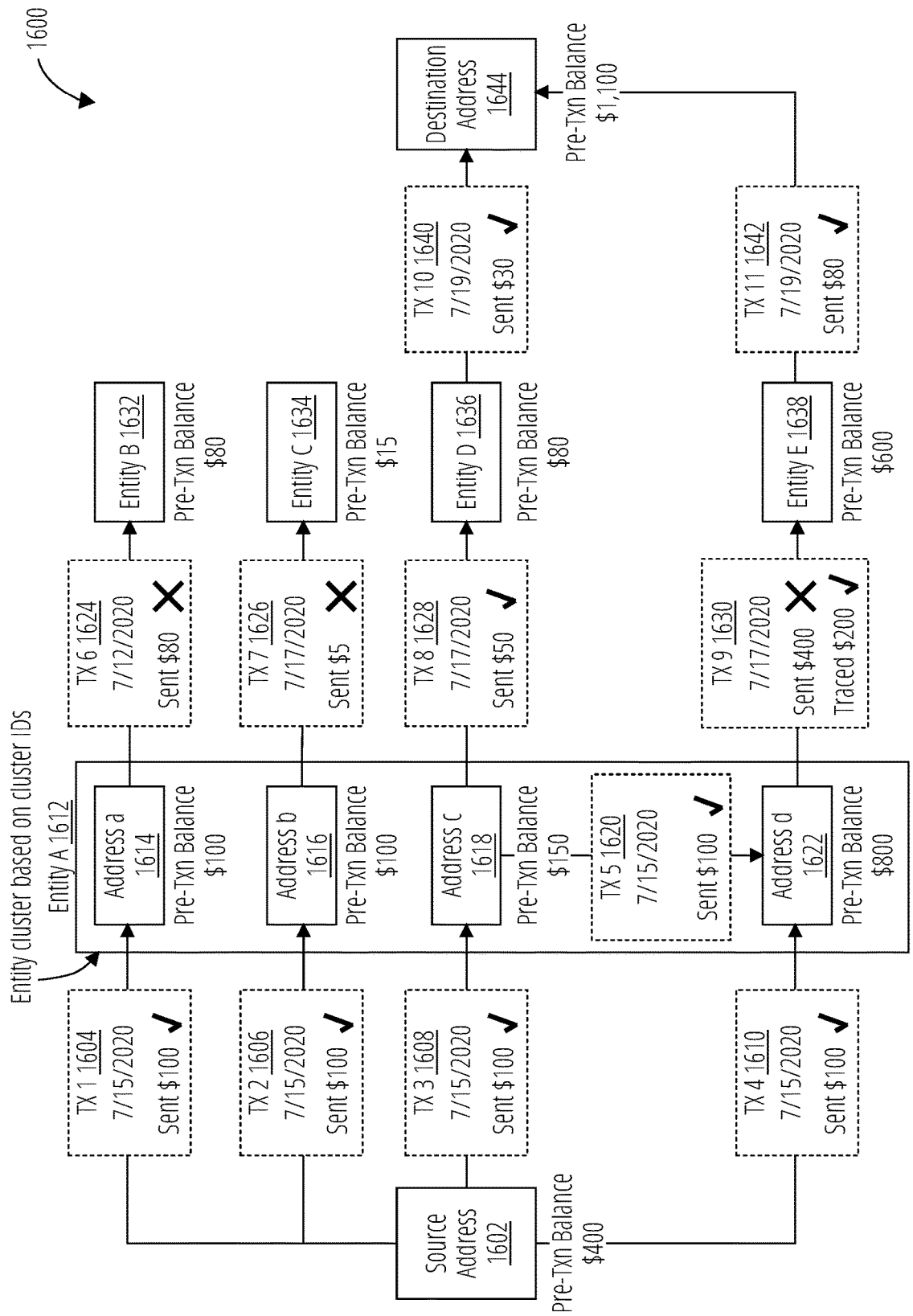
FIG. 16 illustrates a blockchain transaction flow block diagram 1600 in accordance with one embodiment.

The auto tracing 1412 system or module may accept these inputs and employ machine learning and artificial intelligence to trace a path from a source to a destination as illustrated in FIG. 16 below. The auto tracing 1412 system may implement an algorithm that traces based on blockchain addresses or based on blockchain transactions. A manual tracing interface may also be provided to customize path information provided by auto tracing, or to generate paths directly from the input data.

The auto tracing 1412 system may output a result graph 1414. The result graph 1414 may provide the user with a clear and easily understood visualization of the transactions traced from source to destination. The following types of visualization and monitoring may be implemented using the systems disclosed herein:

1. Interactive visualization (as described with regard to FIG. 16):
   Topological sort to graph may be laid out intermediate transactions (hops) between the digital account source address 1602 and the digital account destination address 1644
   Time-bound tracing may trace paths restricted by time and/or trace transactions that happen after initial transaction on each "hop."
   Value-bound tracing may limit results based on a custom minimum value<traced value<original fund
   Visualizations may highlight entire tracing path
1. Summary investigation report (as described with regard to FIG. 19A):
   Tracing destination summary statistics may display percentage by label:
     Example: 67% funding going to BINANCE™ exchange; 13% funding going to dark web markets; 20% remains unknown.
   Visualization may illustrate all money paths from an original address in an expandable interactive view. Topological sorting algorithm may ensure graph layout reflects the stages of money flow.
1. Proactive Monitoring system (as described with regard to FIG. 19B):
   Alert will be sent to the registered recipient once the rule is triggered.
     Example: a new receiver wallet suddenly transfers out the funding.

Address Clustering

Address clustering labels 1416 may be implemented as labels for each entity based on transactions. This optional element may be most useful in tracing cryptocurrency transactions (e.g., those involving Bitcoin, Ethereum, etc.). Address clustering labels 1416 may group similar addresses into one cluster identifier (cluster ID) using characteristics such as Bitcoin unspent transaction output (UTXO), intelligence labels in an address lookup table that may indicate the address is associated with a known exchange, terrorist, hacker, etc., and money-laundering based behavior prediction labels based on transactions, such as unknown exchange addresses, cryptocurrency mixers, etc.

Pseudo Code for Address Clustering
```
1 procedure Address Clustering is
2 Collect address history transactions
3 For each address:
4   If only has one transaction:
5     Create unique cluster id for this address directly
6   Else:
7     Address transaction behavior analysis
8     a. Collect address history transactions
9     b. Create address similarity feature for all these addresses
10    c. Calculate address similarity
11    If similar addresses:
12      If any of these similar addresses has cluster id:
13        If found multiple cluster id among the similar addresses:
14          choose one cluster id and merge the rest
15        Else:
16          —Assign similar addresses to the cluster id
17      Else:
18        —Create unique cluster id for all these similar addresses
19    Else:
20      —Create cluster id for each unsimilar address
21 End
```

AI Graph Search Algorithms

AI graph search algorithms may automatically select the best candidate paths to expand based on auto tracing results. The disclosed solution may utilize greedy breadth first search algorithms, Dijkstra search algorithms, or other heuristic-based graph search algorithms such as A*, D*, IDA*, etc., as are well understood in the art.

Pseudo Code for Greedy Breadth First Search Algorithm
```
function check_condition (node):
  1 Let R be graph // R is the final result graph of
    addresses as vertex
    and transactions as edge
  2
  3 BFS_Anchain_Autotracing (G, s, d, ts_start, ts_end,
    volume_min, hop_max)
  4 let Q be queue.
  5 Q.enqueue(s)
  6
  7 mark s as visited.
  8
  9 while (Q is not empty)
  10 v=Q.dequeue( )
  11
  12 for all neighbours w of v in Graph G
  13   if w is not visited
  14   for all the edges e between w and v
        // each edge is a transaction
  15   if e.direction=d and e.volume>volume_min and
        ts_start<e.timestamp<ts_end:
  16     if w has label:
  17       add w and e to R
  18     elif w.hop==hop_max:
  19       add w and e to R
  20     elif w.hop<hop_max:
  21       Q.enqueue(w)
  22     mark w as visited
  23 return R
```

Pseudo Code for Dijkstra Algorithm
```
1 let the distance between each neighbor vertex to be 1
  (hop)
2
3 function Dijkstra_Anchain_Autotracing(source, direction, ts_start,
  ts_end, volume_min, hop_max):
4 create vertex set Q
5 let Graph be the graph, a circle with radius of hop_max,
  originating at source.
6
7 for each vertex v in Graph:
8   dist[v]←INFINITY
9   prev[v]←UNDEFINED
10  add v to Q
```

```
11 dist[source]←0
12
13 while Q is not empty:
14   u←vertex in Q with min dist[u]
15
16   remove u from Q
17
18   for each neighbor v of u: // only v that are still in Q
19   for all the edge e between w and v // each edge is a
       transaction
20     if e.direction=direction and e.volume>volume_min
       and
       ts_start<e.timestamp<ts_end:
21       alt dist[u]+length(u, v)
22       if alt<dist[v]:
23         dist[v]←alt
24         prev[v]←u
25
26 for all the v in prev[ ]
27   apply labels to v
28
29 return dist[ ], prev[ ]
```

Figure 15:
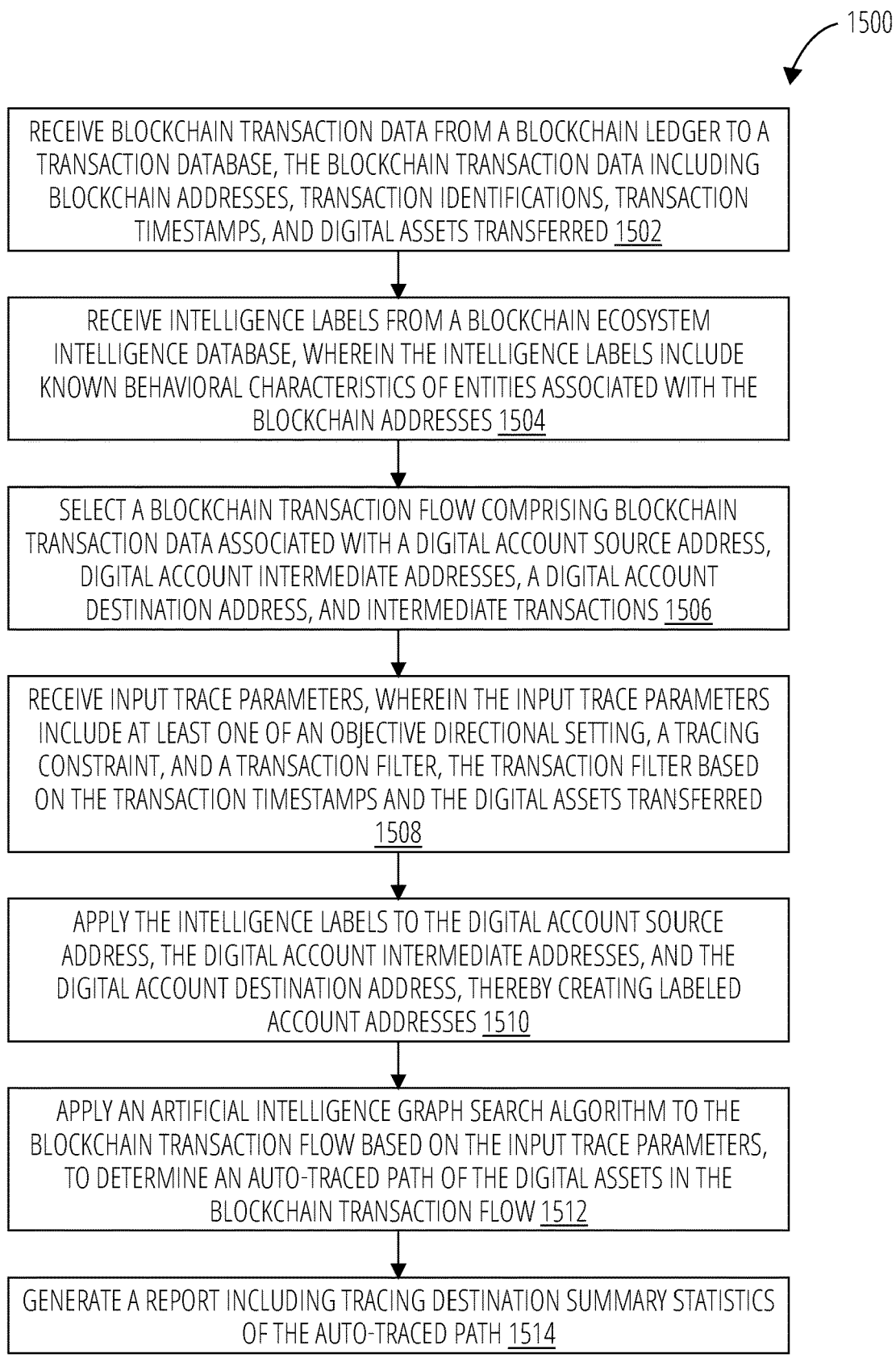
FIG. 15 illustrates a routine 1500 in accordance with one embodiment.

FIG. 15 illustrates a routine 1500 that may be performed by an auto tracing 1412 module, such as that illustrated in FIG. 14, in accordance with one embodiment. In block 1502, a transaction database such as the transaction database 1408, receives blockchain transaction data from a blockchain ledger 118 such as that introduced with respect to FIG. 1. In some embodiments, the blockchain ledger 118 may be processed through the blockchain transaction ETL 1404. The blockchain transaction data may include blockchain addresses, transaction identifications, transaction timestamps, and digital assets transferred. Digital assets may include cryptocurrency, fiat money, or other currencies represented by digital data capable of moving from one digital account to another through digital transactions over the Internet or otherwise electronically, by digital transfer.

In block 1504, intelligence labels from a blockchain ecosystem intelligence (BEI) database may be received. The intelligence labels may include known behavioral characteristics of entities associated with the blockchain addresses. A BEI label database 1406 such as that of FIG. 14 may receive information from a blockchain address labeling pipeline 1402, and store label information to transmit to the auto tracing 1412 module. In one embodiment, the blockchain address labeling pipeline 1402 may include the entity knowledge base engine 110 of FIG. 1, which comprises the black list intelligence database 112, device intelligence database 114, and computer network intelligence database 116.

Figure 20:
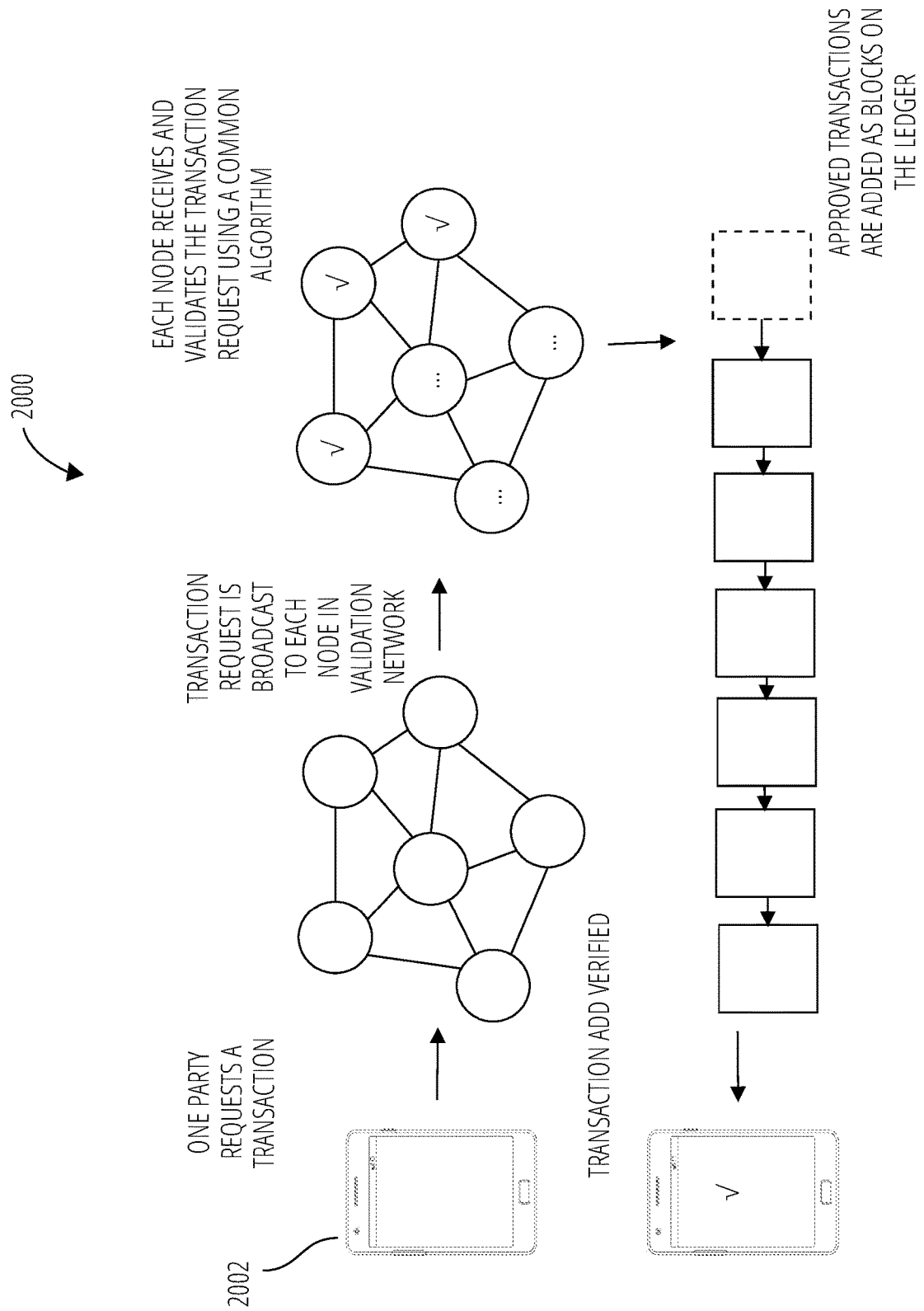
FIG. 20 illustrates a blockchain transaction process 2000 in accordance with one embodiment.

In block 1506, a blockchain transaction flow may be selected, such as that illustrated in the blockchain transaction process 2000 of FIG. 20. The blockchain transaction flow may comprise the blockchain transaction data associated with a digital account source address, digital account intermediate addresses, a digital account destination address, and intermediate transactions, wherein the intermediate transactions transfer the digital assets between the digital account source address and the digital account destination address. The entities associated with these blockchain addresses include cryptocurrency addresses, cryptocurrency address clusters, accounts includes Central Bank Digital Currency (CBDC), and fiat bank accounts.

In block 1508, input trace parameters such as the input trace parameters 1410 of FIG. 14 may be received. In one embodiment, the input trace parameters may include an objective directional setting, a tracing constraint, and a transaction filter. The transaction filter may be based on the transaction timestamps and the digital assets transferred. The transaction filter may include but may not be limited to a time range, a number of intermediate transactions, or a minimum amount of transferred assets.

In block 1510, the intelligence labels may be applied to the digital account source address, the digital account intermediate addresses, and the digital account destination address, thereby creating labeled account addresses. In one embodiment, machine learning based behavior prediction labels may also be applied to these addresses, based on input trace parameters. The machine learning based behavior prediction labels may be based in part on the behavior of entities associated with at least one of crypto exchanges, crypto mixers, bots, hackers, and terrorists.

In one embodiment, address clustering labels may be added to the blockchain transactions. The address clustering labels may be based on identifying similar addresses using address transaction behavior analysis, and grouping the similar addresses into cluster IDs, such as is introduced with regard to the address clustering labels 1416 of FIG. 14. The cluster IDs may be applied to the blockchain transaction flow.

Transaction behavior analysis may include collecting address history blockchain transactions, collecting real world entity information, creating address similarity features for the collected address history blockchain transactions, calculating address similarities, and merging addresses, based on the address similarities, into an existing cluster ID or a new cluster ID. The real world entity information may include office geolocation, phone number, and email associated with the traced address. Based on the transaction behavior analysis, metrics may be created for behavior features at each address, such as the transaction time, transaction frequency, transaction address network, transaction volume, etc., observed for each address. Similarities in these metrics between addresses may be calculated using distance metrics such as cosine similarity, Pearson's correlation, or other analogous distance metrics.

In block 1512, an artificial intelligence graph search algorithm may be applied to the blockchain transaction flow based on the input trace parameters. The artificial intelligence graph search algorithm may determine an auto-traced path of the digital assets in the blockchain transaction flow. In one embodiment, the artificial intelligence graph search algorithm may be a heuristic based graph search algorithm. In other embodiments, the heuristic based graph search algorithm may be a Greedy Breadth First Search algorithm, a Dijkstra search algorithm, an A* search algorithm, a D* search algorithm, or an IDA* algorithm.

In block 1514, a report may be generated, such as the result graph 1414 of FIG. 14. The report may include tracing destination summary statistics of the auto-traced path. A user interface may be constructed providing interactive visualization of a trace path. The interactive visualization may include topological sorting to graph layout by the intermediate transactions between the digital account source address and the digital account destination address. The interactive visualization may show time-bound tracing, where the trace path is restricted by time or hops after a specific transaction. The visualization may show value-bound tracing, where the trace path is based on the transaction values in the trace, with at least a portion of the trace path highlighted.

In one embodiment, the report may show a percentage of funding by labeled account address and a visualization of the auto-traced path from the digital account source address to the digital account destination address, in an expandable interactive view. In one embodiment, the report may show all digital asset paths from the digital account source address to the digital account destination address, in an expandable interactive view.

An alert timeline may be created in one embodiment. The alert timeline may monitor suspicious blockchain addresses, based on the intelligence labels, with wallets containing funds that have not been transferred. An alert may be generated requesting further investigation of suspicious blockchain addresses with un-transferred funds.

Other technical features may be readily apparent to one skilled in the art from the following figures, descriptions, and claims.

FIG. 16 illustrates a blockchain transaction flow block diagram 1600 in accordance with one embodiment. The blockchain transaction flow block diagram 1600 comprises a digital account source address 1602, intermediate transaction 1 1604, intermediate transaction 2 1606, intermediate transaction 3 1608, intermediate transaction 4 1610, intermediate transaction 5 1620 intermediate transaction 6 1624, transaction 7 1626, intermediate transaction 8 1628, intermediate transaction 9 1630, intermediate transaction 10 1640, intermediate transaction 11 1642, Entity A 1612, which is an entity cluster based on cluster IDs and contains Address a 1614, Address b 1616, Address c 1618, and Address d 1622, additional entities entity B 1632, entity C 1634, entity D 1636, and entity E 1638, and a digital account destination address 1644.

The blockchain transaction flow block diagram 1600 illustrates how the auto tracing 1412 AI introduced in FIG. 14 may trace $400 from a source wallet through four hops before it arrives at a destination wallet as $110. Check marks indicate transactions considered by the AI based on a set of trace parameters. In this case, transactions occurring after the initial transaction date of Jul. 15, 2020 may be considered. In addition, an upper and lower bound for transaction amount may be set, such that transactions of more than $10 and less than or equal to $1,000 may be considered, while others may be omitted.

The digital account source address 1602, digital account destination address 1644, and Address a 1614 through entity D 1636 are all digital accounts. Digital accounts may act as repositories for digital assets such as cryptocurrency, fiat money, or other currencies represented by digital data capable of moving from one digital account to another through digital transactions over the Internet. Digital accounts may comprise cryptocurrency wallets, exchange accounts, accounts comprising Central Bank Digital Currency (CBDC), etc., and may be represented by unique digital addresses, as is well understood by those skilled in the art.

The tracing begins with four transactions of $100 each sent by the digital account source address 1602 on Jul. 15, 2020 to the addresses in Entity A 1612. Entity A 1612 may comprise a set of digital accounts that have been identified as having a known relationship, and have been tagged with the same cluster IDs as described with respect to the address clustering labels 1416 of FIG. 14. The transactions associated with Entity A 1612 comprise intermediate transaction 1 1604 to Address a 1614, intermediate transaction 2 1606 to Address b 1616, intermediate transaction 3 1608 to Address c 1618, and intermediate transaction 4 1610 to Address d 1622. Also on Jul. 15, 2020, Address c 1618 sends $100 to Address d 1622 via intermediate transaction 5 1620. intermediate transaction 1 1604-intermediate transaction 5 1620 all meet the parameters defined for the auto tracing, being less than or equal to $100, and being on or after Jul. 15, 2020.

An intermediate transaction 6 1624 may be identified as originating with Address a 1614, with entity B 1632 as the intended destination. However, this intermediate transaction 6 1624 is identified as occurring on Jul. 12, 2020, which falls before the timeframe of interest. Thus this transaction may be ignored. Address b 1616 may initiate a transaction 7 1626 to entity C 1634, but this transaction 7 1626 may involve $5, falling outside the amount range of interest, being less than $10.

In addition to intermediate transaction 5 1620 to Address d 1622, Address c 1618 may initiate an intermediate transaction 8 1628 to entity D 1636. This intermediate transaction 8 1628 may be included in the auto trace, as occurring on Jul. 17, 2020 (after Jul. 15, 2020) and as involving an amount of $50, which falls within the range of interest.

Address d 1622 may initiate intermediate transaction 9 1630 to entity E 1638. This transaction falls after the start date parameter entered, and involves $400, which falls within the range of monetary values being traced. However, $200 of the $400 transferred may be traceable from the digital account source address 1602 ($200 being the sum of intermediate transaction 4 1610 directly from the digital account source address 1602 and intermediate transaction 5 1620 from the digital account source address 1602 by way of Address c 1618). Thus, in the illustrated embodiment, the $200 is traced.

From this point, entity B 1632 and entity C 1634 may not initiate any transactions of interest, but intermediate transaction 10 1640, initiated by entity D 1636, and intermediate transaction 11 1642 by entity E 1638 may be traced as within specified parameters, and having the digital account destination address 1644 as their destination. In this matter, $110 ($30 from intermediate transaction 10 1640 and $80 from intermediate transaction 11 1642) may be traced from the digital account source address 1602 to the digital account destination address 1644.

Additional actions may be taken on the digital account destination address 1644, depending on what actions are initiated by the digital account destination address 1644, as well as characteristics of the pass-through entities Address a 1614-entity E 1638. For example, if the fund goes through exchange addresses, the trace may stop. Exchange contact information and transaction records may be provided for further engagement. If the fund goes through criminal addresses, the trace may stop, and exchange contact information and transaction records may be provided for further engagement. If the fund moves to other entities, however, the fund may continue to be traced, a new auto tracing being created for that purpose.

Figure 17:
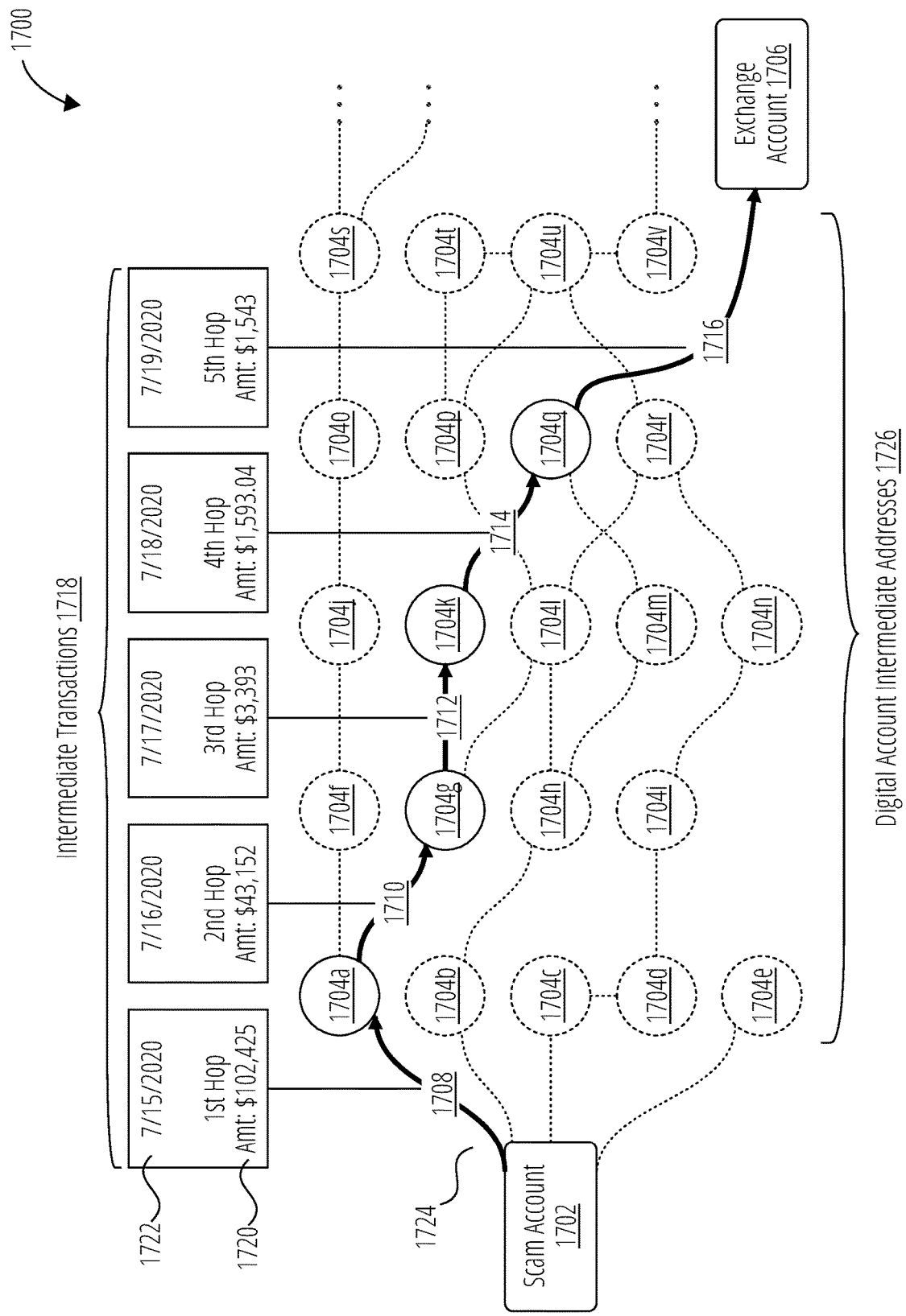
FIG. 17 illustrates a suspect transaction path 1700 in accordance with one embodiment.

FIG. 17 illustrates a suspect transaction path 1700 in one embodiment. A scam account 1702, entities 1704a-1704v which may be represented by digital account intermediate addresses 1726, an exchange account 1706, and intermediate transactions 1718 or hops (a first hop 1708, a second hop 1710, a third hop 1712, a fourth hop 1714, and a fifth hop 1716 are shown) forming an auto-traced path 1724. The digital assets 1720 transferred with each intermediate transactions 1718 are shown, along with a transaction timestamp 1722. This illustration shows how money from a source (scam account 1702) to a destination (exchange account 1706) may be moved through multiple entities via multiple hops. The digital account intermediate addresses are indicated with solid-lined circles.

A suspect transaction path 1700 diagram similar to that shown may indicate in a clear and easily visualized manner how monies from the scam account 1702 may move through the first hop 1708 to entity 1704a, then through the second hop 1710 to entity 1704g, then through the third hop 1712 to entity 1704k, then through the fourth hop 1714 to 1704q, and finally through the fifth hop 1716 to the exchange account 1706. The time of each hop and the amount transferred via each hop may be shown as well.

Figure 18:
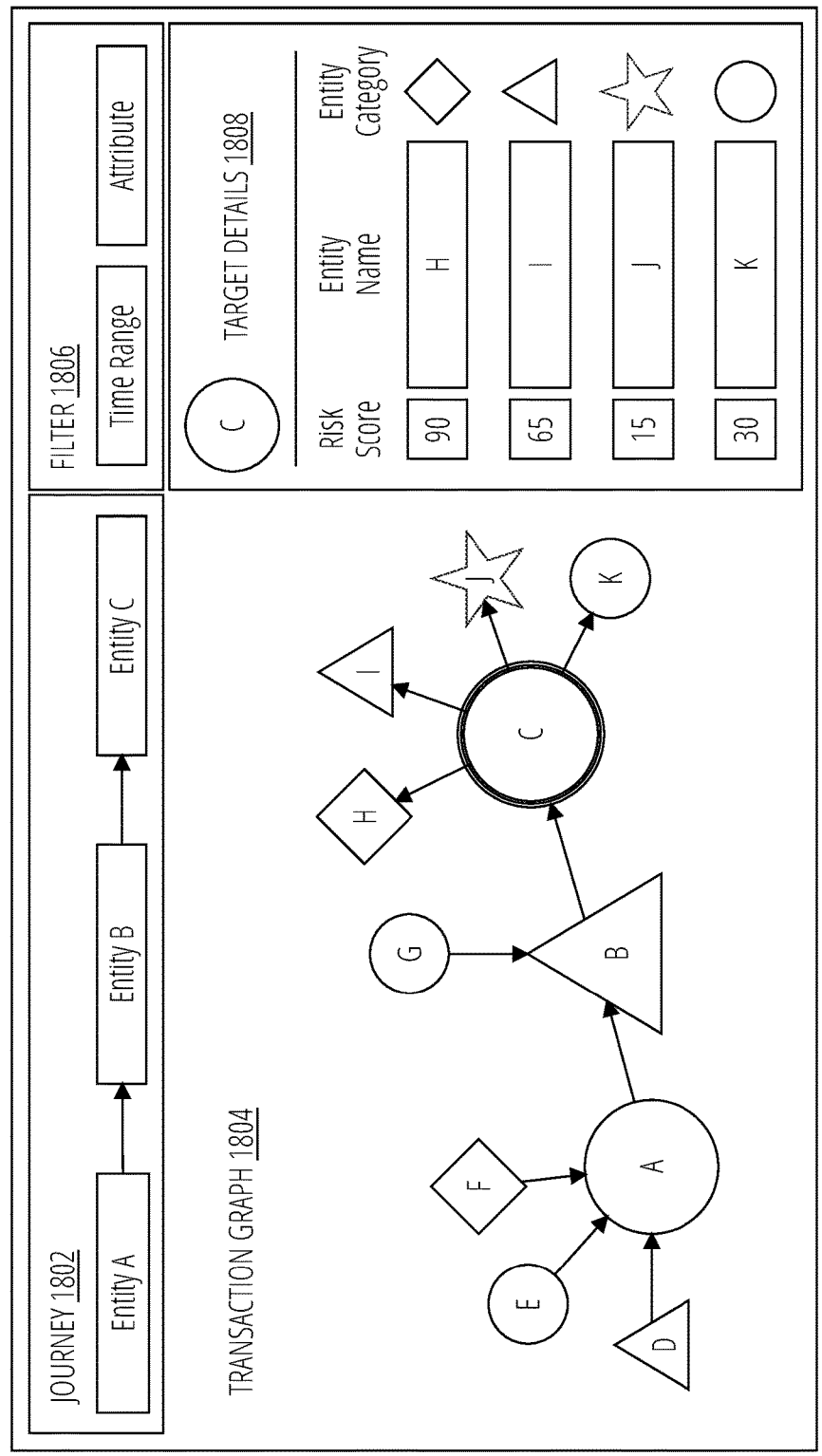
FIG. 18 illustrates a journey board 1800 in accordance with one embodiment.

FIG. 18 illustrates a manual trace interface or journey board 1800 in accordance with one embodiment. The journey board 1800 may comprise a journey 1802 display area, a transaction graph 1804 display area, a filter 1806 display area, and a target details 1808 display area.

This option for manual tracing may be provided for users to investigate further in customized routes that are not covered within the auto tracing results. A manual mode graph investigation may record every hop the user expands on the graph. In this manner, the user may run a deep and complicated investigation, and roll back to previous investigation steps as needed.

The journey 1802 display may show the overall transaction route of interest to the user, and may in some embodiments incorporate an interface allowing the user to add nodes to the identified journey of interest. The transaction graph 1804 may chart the entities having transactions with those entities identified in the journey 1802 display. The filter 1806 area may allow the user to set parameters such as transaction time range and other attributes by which transactions may be filtered from the information displayed in the transaction graph 1804. The target details 1808 area may provide additional information on entities interacting with a selected target entity. For example, if entity C is selected as shown by the highlighting in this illustration, information may be provided about entities H-K, which interact with entity C. This information may include the entity name, a risk score associated with that entity, and a symbol indicating the category the entity may belong to. Categories may include high risk entity cluster members, trusted banking entities, individual electronic currency accounts, businesses, etc.

Figure 19A:
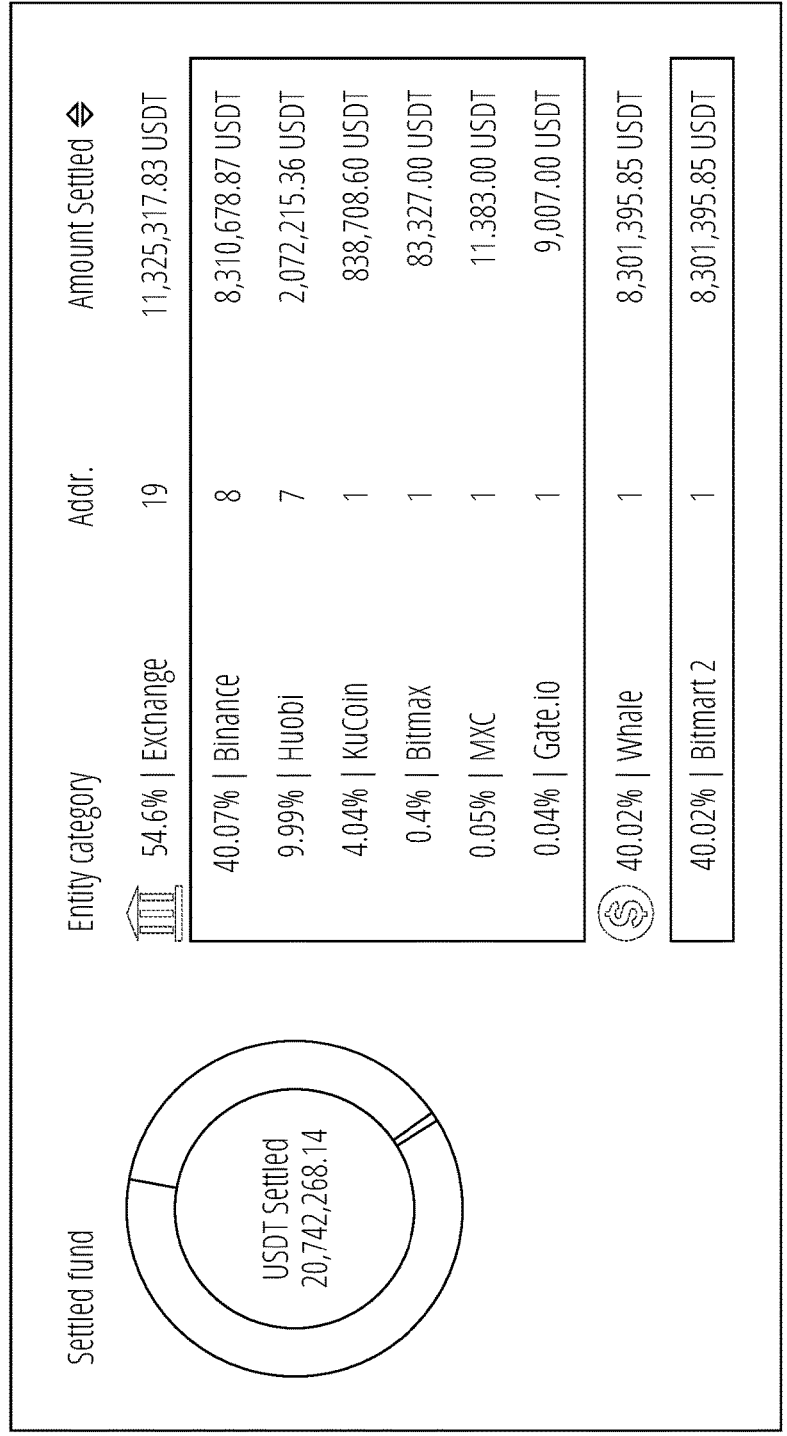
FIG. 19A illustrates a summary statistics report 1900a in accordance with one embodiment.
Figure 19B:
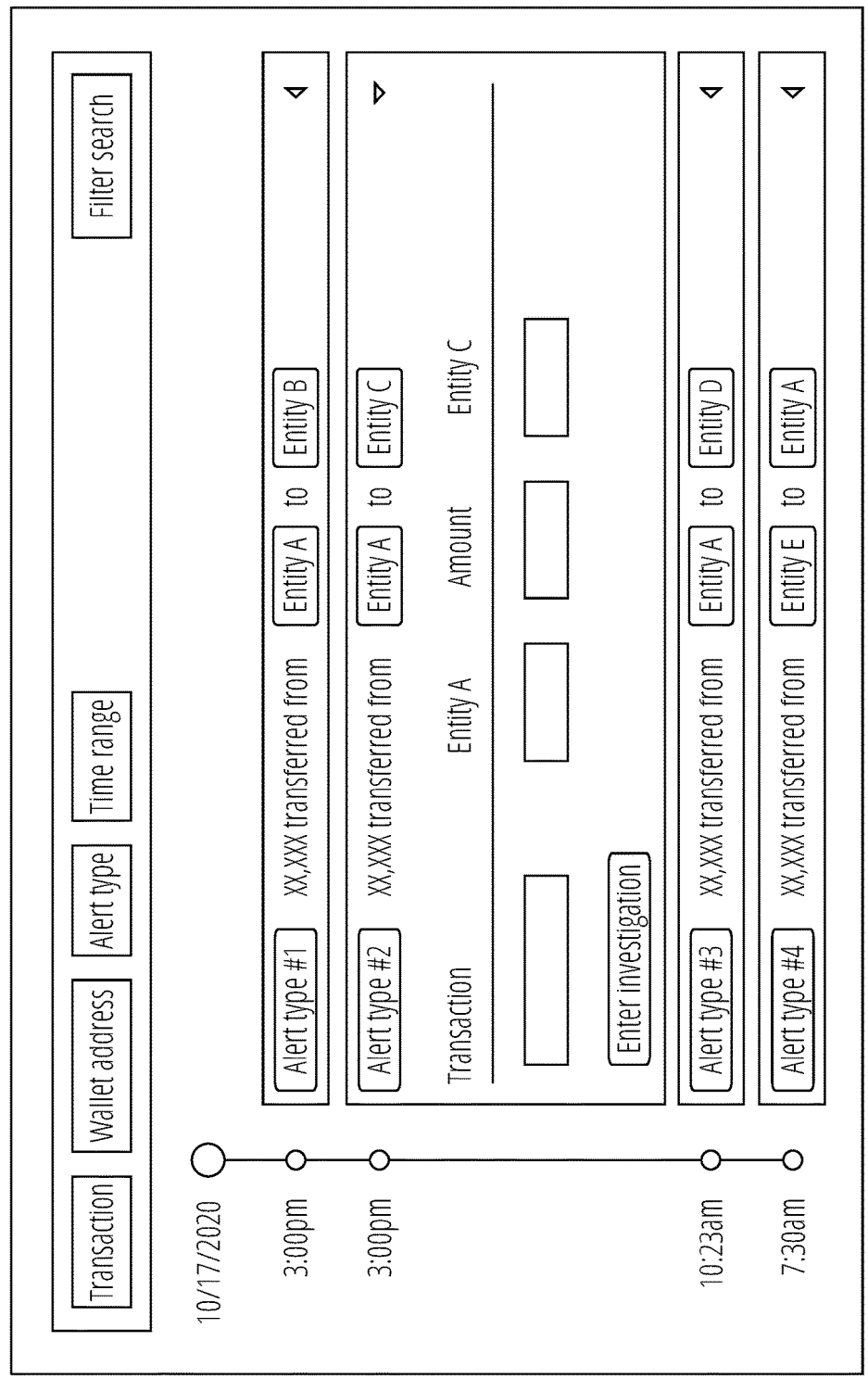
FIG. 19B illustrates a summary statistics report alert timeline 1900b in accordance with one embodiment.

FIG. 19A and FIG. 19B illustrate exemplary results presentations in accordance with one embodiment. Results presentations may include a summary statistics report 1900a and an alert timeline 1900b as shown.

The summary statistics report 1900a may show percentages indicating where the funds received at a receiving address may come from. In the illustrated example, 20,742,268.14 USDT may be settled in a settled fund at the destination or receiving address. Tether (TSDT) is a blockchain-based cryptocurrency whose cryptocoins in circulation are backed by an equivalent amount of traditional fiat currencies, like the dollar, the euro, or the Japanese yen, which are held in a designated bank account. The largest source for that fund (54.6% or 11,325,317.83 USDT) may come from exchange entities. The exchange entities may be listed, along with their addresses and the amounts USDT and percentages associated with them. A single whale entity may account for 40.02% of the settled fund. Other sources not shown may account for the remainder.

The summary statistics report 1900a may in one embodiment be created by the auto tracing system disclosed herein to capture and display the key events detected as part of an investigation. The timeline may provide a date, time, source, destination, and amount for suspicious transactions generating different types of alerts. The timeline may be filtered based on transaction, wallet address, alert type, and time range, as shown. Other parameters may be included as filtering options, may be displayed for each alert, etc. Suspicious wallets having funds that have not moved yet may be proactively monitored. An investigation case may be created automatically based on triggered alerts.

Referring to FIG. 20, a blockchain transaction process 2000 is an ever-growing set of data blocks. Each block records a collection of transactions. Blockchains distribute these transactions across a group of computers. Each computer maintains its own copy of the blockchain transactions.

A blockchain is a continuously growing list of records, called blocks, which are linked and secured using cryptography. Each block typically comprises a cryptographic hash of the previous block, a timestamp, and transaction data. By design, a blockchain is resistant to modification of the data. Blockchains may implement an open, distributed ledger that can record transactions between two parties efficiently and in a verifiable and permanent way.

A blockchain is typically managed by multiple parties collectively adhering to a protocol for inter-node communication and validating new blocks. Once recorded, the data in any given block cannot be altered retroactively without alteration of all subsequent blocks, which needs consensus among the operators.

Cryptography involving mathematical methods of keeping data secret and proving identity is utilized when recording transactions. One digital key ensures an owner for example on a transaction requesting device 2002, can enter a transaction to the blockchain involving their assets, and another digital key lets other parties confirm it really was the owner who added the transaction.

Blockchain is resistant to tampering or other changes by utilizing a cryptographic technique called the hash. Hashing reduces data to a sequence of seemingly random characters—for example, the hash of the phrase "the quick brown fox" is "9ECB36561341D18EB65484E833EFEA61ED-C74B84CF5E6AE1B81C63533E25FC8F" using a hash method called SHA-256. Tweaking just one letter in the phrase produces a completely different hash, and you can't go backward to figure out the original data from the hash.

With blockchain, hashes are linked together so any minute change is immediately visible, not just for the block housing it but for all other blocks added later. With red flags that big for changes that small, auditing becomes easier.

Figure 21:
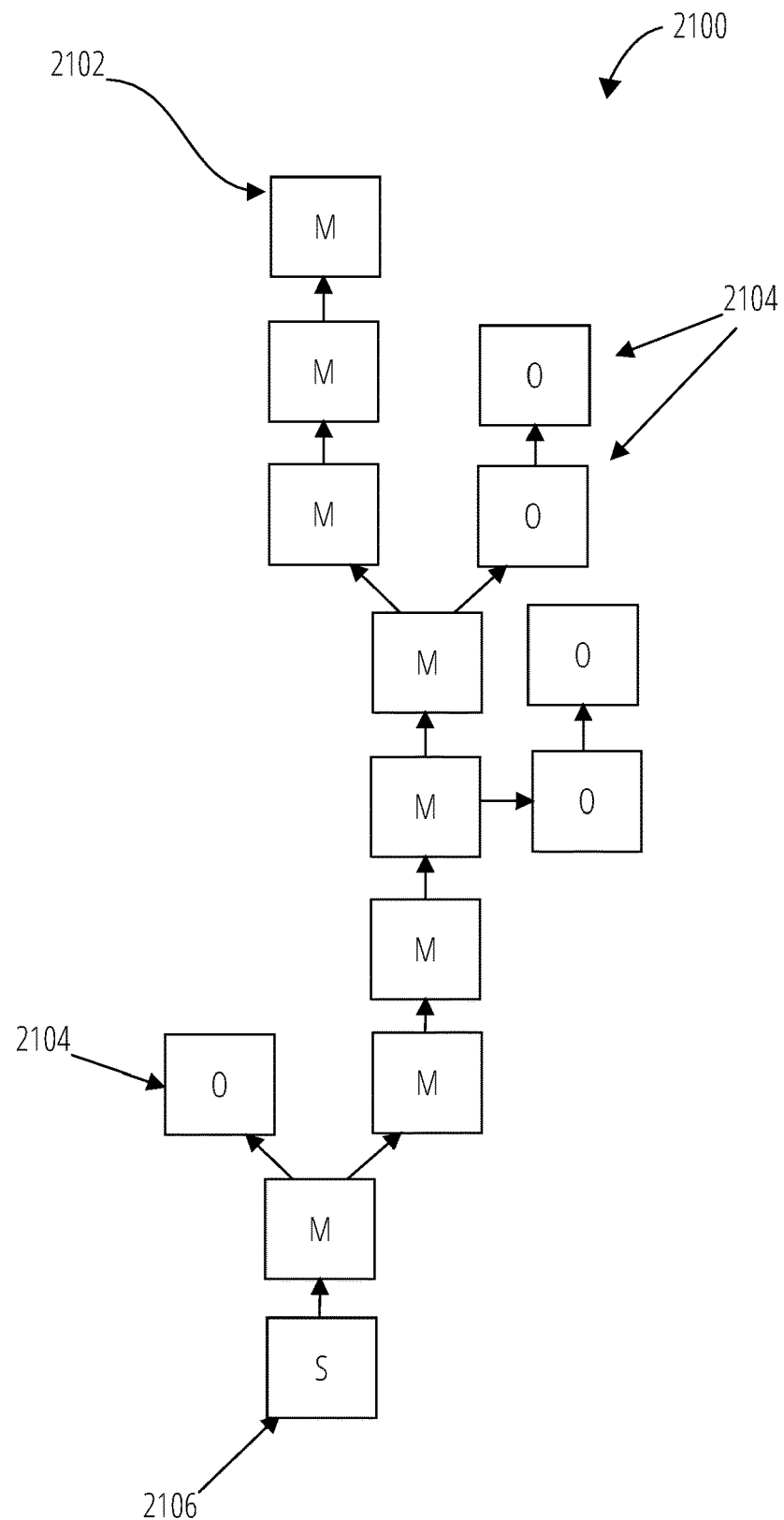
FIG. 21 illustrates a blockchain formation 2100 in accordance with one embodiment.

FIG. 21 illustrates an exemplary blockchain formation 2100. The mainchain 2102 (M blocks) comprises the longest series of blocks from the start block 2106 (S block) to the current block. Orphan blocks 2104 (0 blocks) exist outside of the main chain.

Blocks hold batches of valid transactions that are hashed and encoded, for example into a Merkle tree. Each block includes the cryptographic hash of the prior block in the blockchain formation 2100, linking the two. The linked blocks form a chain. This iterative process confirms the integrity of the previous block, all the way back to the original start block 2106.

Sometimes separate blocks can be produced concurrently, creating a temporary fork. In addition to a secure hash-based history, the blockchain formation 2100 has a specified algorithm for scoring different versions of the history so that one with a higher value can be selected over others. Blocks not selected for inclusion in the mainchain 2102 are called orphan blocks 2104. Peers supporting the blockchain formation 2100 have different versions of the history from time to time. They keep the highest-scoring version of the blockchain formation 2100 known to them. Whenever a peer receives a higher-scoring version (usually the old version with a single new block added) they extend or overwrite their local version of the blockchain formation 2100 and retransmit the improvement to their peers. There is never an absolute guarantee that any particular entry will remain in the best version of the history forever. Because blockchains are typically built to add the score of new blocks onto old blocks and because there are incentives to work on extending with new blocks rather than overwriting old blocks, the probability of an entry becoming superseded goes down exponentially as more blocks are built on top of it, eventually becoming very low. For example, in a blockchain using the proof-of-work system, the chain with the most cumulative proof-of-work is considered the valid one by the network. There are a number of methods that can be used to demonstrate a sufficient level of computation. Within a blockchain the computation is carried out redundantly rather than in the traditional segregated and parallel manner.

Figure 22:
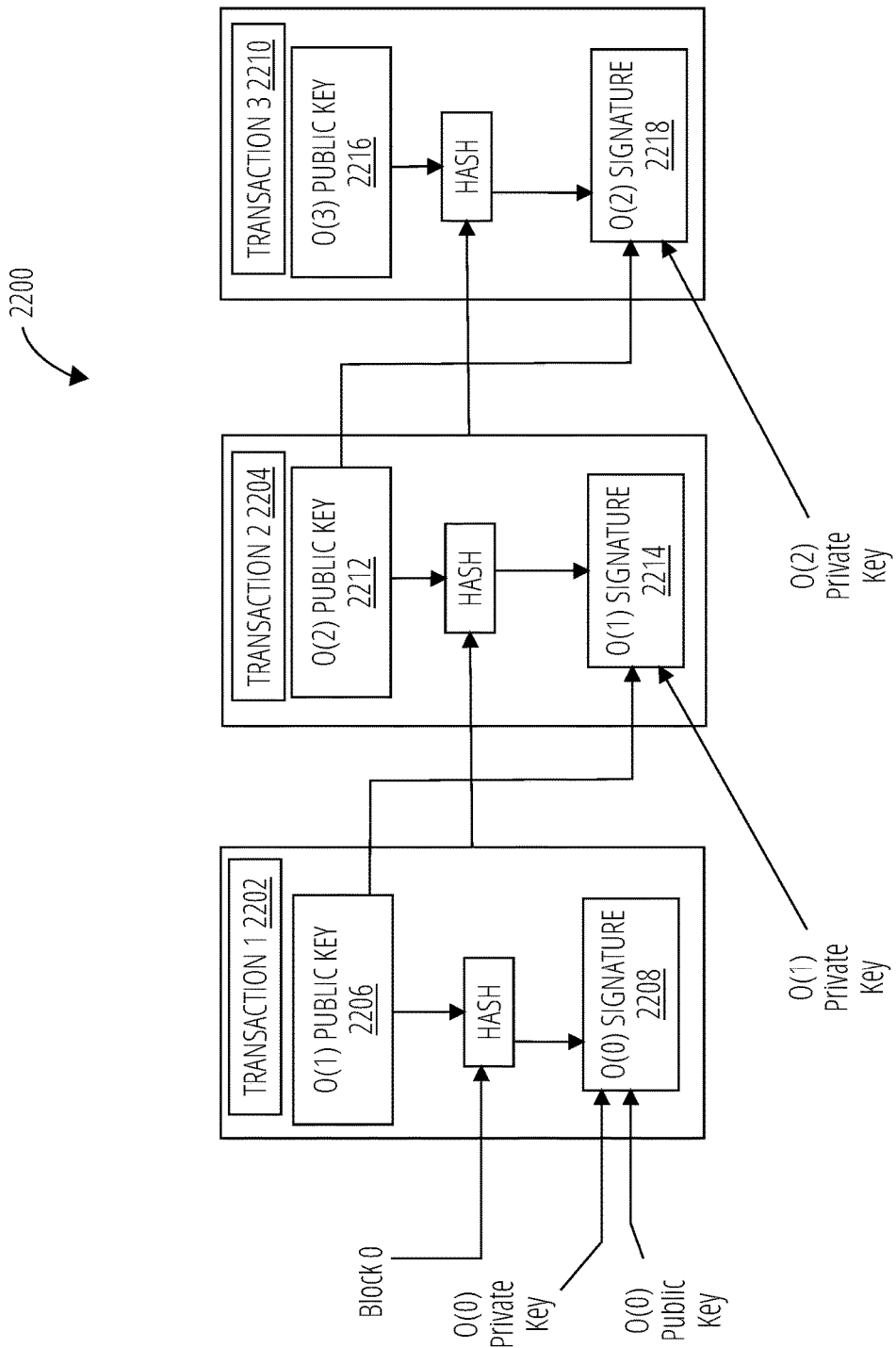
FIG. 22 illustrates a blockchain 2200 in accordance with one embodiment.

FIG. 22 illustrates an embodiment of an irreversible transaction blockchain 2200. The blockchain 2200 is a sequence of digitally signed transactions (transaction 1 2202, transaction 2 2204, and transaction 3 2210 etc.). Each transaction includes the current owners public key (block 1 owner public key 2206, block 2 owner public key 2212, and block 3 owner public key 2216 respectively) and the previous owner's signature (O(0) signature 2208, O(1) signature 2214, and O(2) signature 2218), which are generated using a hash function. The owner of a transaction can examine each previous transaction to verify the chain of ownership. Unlike traditional check endorsements, the transactions in the blockchain 2200 are irreversible, which mitigates fraud.

Figure 23:
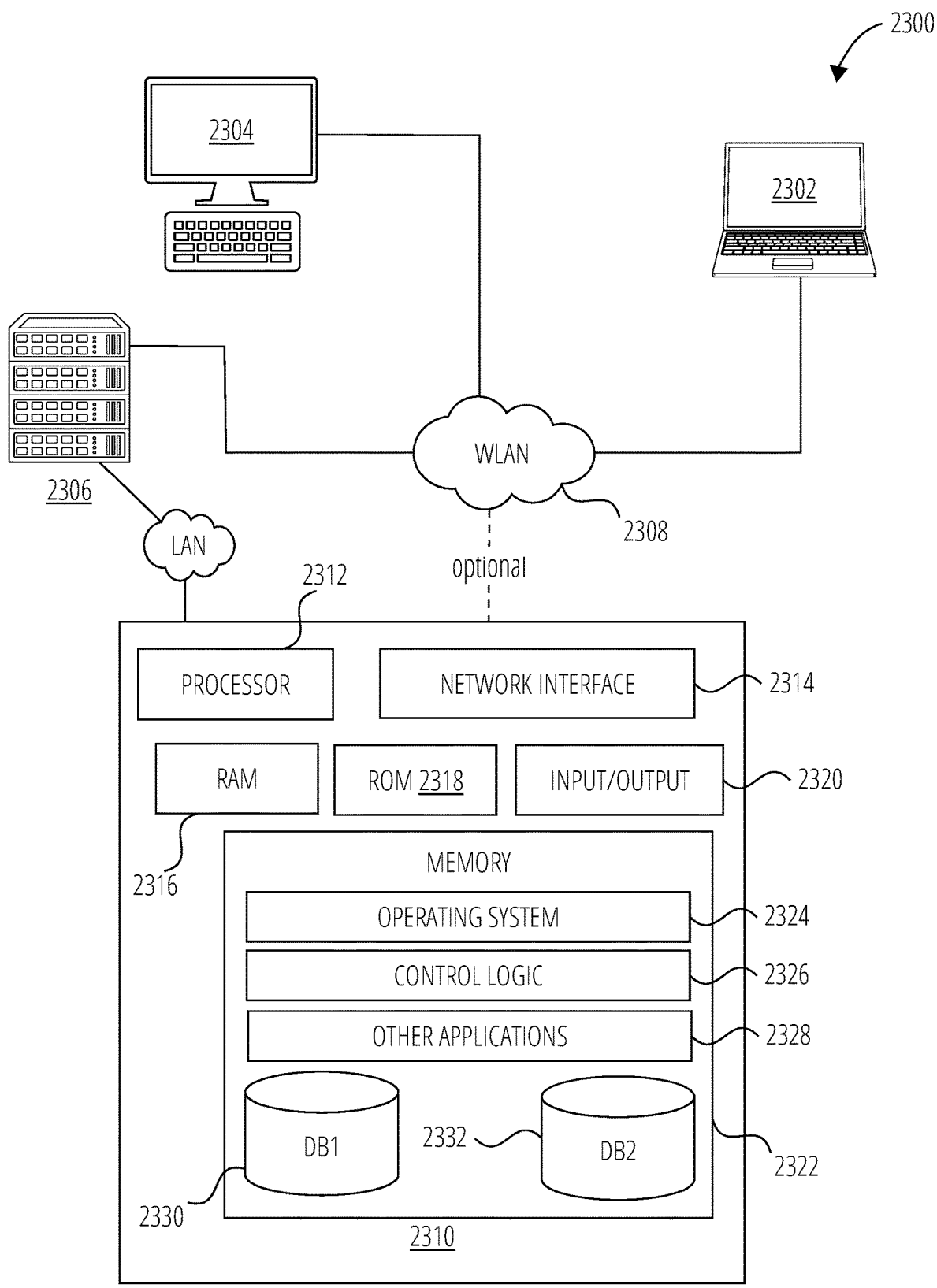
FIG. 23 depicts an illustrative system architecture and data processing device 2300 that may be used in accordance with one or more illustrative aspects described herein.

FIG. 23 illustrates one example of a system architecture and data processing device 2300 that may be used to implement one or more illustrative aspects described herein in a standalone and/or networked environment. Various network nodes data server 2310, web server 2306, computer 2304, and laptop 2302 may be interconnected via a wide area network 2308 (WAN), such as the internet. Other networks may also or alternatively be used, including private intranets, corporate networks, LANs, metropolitan area networks (MANs) wireless networks, personal networks (PANs), and the like. Network 2308 is for illustration purposes and may be replaced with fewer or additional computer networks. A local area network (LAN) may have one or more of any known LAN topology and may use one or more of a variety of different protocols, such as ethernet. Devices data server 2310, web server 2306, computer 2304, laptop 2302 and other devices (not shown) may be connected to one or more of the networks via twisted pair wires, coaxial cable, fiber optics, radio waves or other communication media.

The term "network" as used herein and depicted in the drawings refers not only to systems in which remote storage devices are coupled together via one or more communication paths, but also to stand-alone devices that may be coupled, from time to time, to such systems that have storage capability. Consequently, the term "network" includes not only a "physical network" but also a "content network," which is comprised of the data—attributable to a single entity—which resides across all physical networks.

The components may include data server 2310, web server 2306, and client computer 2304, laptop 2302. Data server 2310 provides overall access, control and administration of databases and control software for performing one or more illustrative aspects described herein. Data server data server 2310 may be connected to web server 2306 through which users interact with and obtain data as requested. Alternatively, data server 2310 may act as a web server itself and be directly connected to the internet. Data server 2310 may be connected to web server 2306 through the network 2308 (e.g., the internet), via direct or indirect connection, or via some other network. Users may interact with the data server 2310 using remote computer 2304, laptop 2302, e.g., using a web browser to connect to the data server 2310 via one or more externally exposed web sites hosted by web server 2306. Client computer 2304, laptop 2302 may be used in concert with data server 2310 to access data stored therein or may be used for other purposes. For example, from client computer 2304, a user may access web server 2306 using an internet browser, as is known in the art, or by executing a software application that communicates with web server 2306 and/or data server 2310 over a computer network (such as the internet).

Servers and applications may be combined on the same physical machines, and retain separate virtual or logical addresses, or may reside on separate physical machines. FIG. 23 illustrates just one example of a network architecture that may be used, and those of skill in the art will appreciate that the specific network architecture and data processing devices used may vary, and are secondary to the functionality that they provide, as further described herein. For example, services provided by web server 2306 and data server 2310 may be combined on a single server.

Each component data server 2310, web server 2306, computer 2304, laptop 2302 may be any type of known computer, server, or data processing device. Data server 2310, e.g., may include a processor 2312 controlling overall operation of the data server 2310. Data server 2310 may further include RAM 2316, ROM 2318, network interface 2314, input/output interfaces 2320 (e.g., keyboard, mouse, display, printer, etc.), and memory 2322. Input/output interfaces 2320 may include a variety of interface units and drives for reading, writing, displaying, and/or printing data or files. Memory 2322 may further store operating system software 2324 for controlling overall operation of the data server 2310, control logic 2326 for instructing data server 2310 to perform aspects described herein, and other application software 2328 providing secondary, support, and/or other functionality which may or may not be used in conjunction with aspects described herein. The control logic may also be referred to herein as the data server software control logic 2326. Functionality of the data server software may refer to operations or decisions made automatically based on rules coded into the control logic, made manually by a user providing input into the system, and/or a combination of automatic processing based on user input (e.g., queries, data updates, etc.).

Memory 2322 may also store data used in performance of one or more aspects described herein, including a first database 2332 and a second database 2330. In some embodiments, the first database may include the second database (e.g., as a separate table, report, etc.). That is, the information can be stored in a single database, or separated into different logical, virtual, or physical databases, depending on system design. Web server 2306, computer 2304, laptop 2302 may have similar or different architecture as described with respect to data server 2310. Those of skill in the art will appreciate that the functionality of data server 2310 (or web server 2306, computer 2304, laptop 2302) as described herein may be spread across multiple data processing devices, for example, to distribute processing load across multiple computers, to segregate transactions based on geographic location, user access level, quality of service (QoS), etc.

One or more aspects may be embodied in computer-usable or readable data and/or computer-executable instructions, such as in one or more program modules, executed by one or more computers or other devices as described herein. Generally, program modules include routines, programs, objects, components, data structures, etc. that perform particular tasks or implement particular abstract data types when executed by a processor in a computer or other device. The modules may be written in a source code programming language that is subsequently compiled for execution or may be written in a scripting language such as (but not limited to) HTML or XML. The computer executable instructions may be stored on a computer readable medium such as a non-volatile storage device. Any suitable computer readable storage media may be utilized, including hard disks, CD-ROMs, optical storage devices, magnetic storage devices, and/or any combination thereof. In addition, various transmission (non-storage) media representing data or events as described herein may be transferred between a source and a destination in the form of electromagnetic waves traveling through signal-conducting media such as metal wires, optical fibers, and/or wireless transmission media (e.g., air and/or space). Various aspects described herein may be embodied as a method, a data processing system, or a computer program product. Therefore, various functionalities may be embodied in whole or in part in software, firmware and/or hardware or hardware equivalents such as integrated circuits, field programmable gate arrays (FPGA), and the like. Particular data structures may be used to more effectively implement one or more aspects described herein, and such data structures are contemplated within the scope of computer executable instructions and computer-usable data described herein.

Various functional operations described herein may be implemented in logic that is referred to using a noun or noun phrase reflecting said operation or function. For example, an association operation may be carried out by an "associator" or "correlator". Likewise, switching may be carried out by a "switch", selection by a "selector", and so on.

Within this disclosure, different entities (which may variously be referred to as "units," "circuits," other components, etc.) may be described or claimed as "configured" to perform one or more tasks or operations. This formulation—[entity] configured to [perform one or more tasks]—is used herein to refer to structure (i.e., something physical, such as an electronic circuit). More specifically, this formulation is used to indicate that this structure is arranged to perform the one or more tasks during operation. A structure can be said to be "configured to" perform some task even if the structure is not currently being operated. A "credit distribution circuit configured to distribute credits to a plurality of processor cores" is intended to cover, for example, an integrated circuit that has circuitry that performs this function during operation, even if the integrated circuit in question is not currently being used (e.g., a power supply is not connected to it). Thus, an entity described or recited as "configured to" perform some task refers to something physical, such as a device, circuit, memory storing program instructions executable to implement the task, etc. This phrase is not used herein to refer to something intangible.

The term "configured to" is not intended to mean "configurable to." An unprogrammed FPGA, for example, would not be considered to be "configured to" perform some specific function, although it may be "configurable to" perform that function after programming.

Reciting in the appended claims that a structure is "configured to" perform one or more tasks is expressly intended not to invoke 35 U.S.C. § 112(f) for that claim element. Accordingly, claims in this application that do not otherwise include the "means for" [performing a function] construct should not be interpreted under 35 U.S.C. § 112(f).

As used herein, the term "based on" is used to describe one or more factors that affect a determination. This term does not foreclose the possibility that additional factors may affect the determination. That is, a determination may be solely based on specified factors or based on the specified factors as well as other, unspecified factors. Consider the phrase "determine A based on B." This phrase specifies that B is a factor that is used to determine A or that affects the determination of A. This phrase does not foreclose that the determination of A may also be based on some other factor, such as C. This phrase is also intended to cover an embodiment in which A is determined based solely on B. As used herein, the phrase "based on" is synonymous with the phrase "based at least in part on."

As used herein, the phrase "in response to" describes one or more factors that trigger an effect. This phrase does not foreclose the possibility that additional factors may affect or otherwise trigger the effect. That is, an effect may be solely in response to those factors, or may be in response to the specified factors as well as other, unspecified factors. Consider the phrase "perform A in response to B." This phrase specifies that B is a factor that triggers the performance of A. This phrase does not foreclose that performing A may also be in response to some other factor, such as C. This phrase is also intended to cover an embodiment in which A is performed solely in response to B.

As used herein, the terms "first," "second," etc. are used as labels for nouns that they precede, and do not imply any type of ordering (e.g., spatial, temporal, logical, etc.), unless stated otherwise. For example, in a register file having eight registers, the terms "first register" and "second register" can be used to refer to any two of the eight registers, and not, for example, just logical registers 0 and 1.

When used in the claims, the term "or" is used as an inclusive or and not as an exclusive or. For example, the phrase "at least one of x, y, or z" means any one of x, y, and z, as well as any combination thereof.

Having thus described illustrative embodiments in detail, it will be apparent that modifications and variations are possible without departing from the scope of the disclosure as claimed. The scope of disclosed subject matter is not limited to the depicted embodiments but is rather set forth in the following Claims.

What is claimed is:

1. A method of generating an action for an illicit digital asset transaction, the method comprising:
receiving blockchain transaction data from a blockchain ledger to a transaction database, the blockchain transaction data including blockchain addresses, transaction identifications, transaction timestamps, and digital assets transferred;
receiving intelligence labels from a blockchain ecosystem intelligence database, wherein the intelligence labels include known behavioral characteristics of entities associated with the blockchain addresses;
selecting a blockchain transaction flow comprising the blockchain transaction data associated with a digital account source address, digital account intermediate addresses, a digital account destination address, and intermediate transactions, wherein the intermediate transactions transfer the digital assets between the digital account source address and the digital account destination address;

receiving input trace parameters, wherein the input trace parameters include at least one of an objective directional setting, a tracing constraint, and a transaction filter, the transaction filter based on the transaction timestamps and the digital assets transferred;

applying the intelligence labels to the digital account source address, the digital account intermediate addresses, and the digital account destination address, thereby creating labeled account addresses;

applying an artificial intelligence graph search algorithm to the blockchain transaction flow based on the input trace parameters, to determine an auto-traced path of the digital assets in the blockchain transaction flow; and generating a report including tracing destination summary statistics of the auto-traced path, the report including suspicious blockchain addresses; and on condition that the report includes a suspicious blockchain address:
  generating an action including at least one of alerting a user of the suspicious blockchain address, alerting the user to the illicit digital asset transaction associated with the suspicious blockchain address, and suspending transactions by the suspicious blockchain address.

2. The method of claim 1, further comprising applying machine learning based behavior prediction labels, based on the input trace parameters, to at least one of the digital account source address, the digital account intermediate addresses, and the digital account destination address, wherein the machine learning based behavior prediction label is based in part on the behavior of entities associated with at least one of crypto exchanges, crypto mixers, bots, hackers, and terrorists.

3. The method of claim 1, further comprising:
  adding address clustering labels to the blockchain addresses, wherein the address clustering labels are based on identifying similar addresses using an address transaction behavior analysis; and
  grouping the similar addresses into cluster IDs.

4. The method of claim 3, wherein the address transaction behavior analysis includes:
  collecting address history blockchain transactions;
  collecting real world entity information, the real world entity information including office geolocation, phone number, and email associated with the traced address;
  creating address similarity features for the collected address history blockchain transactions;
  calculating address similarities;
  merging addresses, based on the address similarities, into an existing cluster ID or a new cluster ID; and
  applying the cluster IDs to the blockchain transaction flow.

5. The method of claim 1, wherein the artificial intelligence graph search algorithm is a heuristic based graph search algorithm.

6. The method of claim 5, wherein the heuristic based graph search algorithms include at least one of:
  a Greedy Breadth First Search algorithm;
  a Dijkstra search algorithm;
  an A* search algorithm;
  a D* search algorithm; and
  an IDA* algorithm.

7. The method of claim 1, further comprising constructing a user interface with interactive visualization of a trace path, the interactive visualization including at least one of:

topological sorting to graph layout by the intermediate transactions from the digital account source address to the digital account destination address;

time-bound tracing, wherein the trace path is restricted by at least time and a number of intermediate transactions after a specific transaction;

value-bound tracing, wherein the trace path is based on values of digital assets transferred in the blockchain transaction flow; and highlighting of at least a portion of the trace path.

8. The method of claim 1, wherein the report includes at least one of:
  a percentage of funding by labeled account address; and
  visualization of the auto-traced path from the digital account source address to the digital account destination address, in an expandable interactive view.

9. The method of claim 1, wherein the report includes visualization of all digital asset paths from the digital account source address to the digital account destination address, in an expandable interactive view, and wherein the transaction filter includes a time range, a number of intermediate transactions, and a minimum amount of transferred assets.

10. The method of claim 1, further comprising creating an alert timeline, wherein in the alert timeline:
  monitors the suspicious blockchain addresses, based on the intelligence labels, with wallets containing funds that have not been transferred; and
  alerts the user requesting further investigation of the suspicious blockchain addresses with un-transferred funds.

11. The method of claim 1, wherein the entities associated with the blockchain addresses include cryptocurrency addresses, cryptocurrency address clusters, accounts comprising Central Bank Digital Currency (CBDC), and fiat bank accounts.

12. A method comprising:
  receiving blockchain transaction data from a blockchain ledger to a transaction database, the blockchain transaction data including blockchain addresses, transaction identifications, transaction timestamps, and digital assets transferred;
  receiving intelligence labels from a blockchain ecosystem intelligence database, wherein the intelligence labels include known behavioral characteristics of entities associated with the blockchain addresses;
  selecting a blockchain transaction flow comprising the blockchain transaction data associated with a digital account source address, digital account intermediate addresses, a digital account destination address, and intermediate transactions, wherein the intermediate transactions transfer the digital assets between the digital account source address and the digital account destination address;
  receiving input trace parameters, wherein the input trace parameters include at least one of an objective directional setting, a tracing constraint, and a transaction filter based on the transaction timestamps and the digital assets transferred;
  applying the intelligence labels to the digital account source address, the digital account intermediate addresses, and the digital account destination address, thereby creating labeled account addresses;
  generating an interactive journey board of the blockchain transaction flow based on the input trace parameters, including paths of the digital assets in the blockchain transaction flow between the blockchain addresses, wherein at least one of one or more of the paths, and portions of paths, may be selected for the journey board by a user.

13. The method of claim 12, further comprising applying machine learning based behavior prediction labels, based on the input trace parameters, to at least one of the digital account source address, the digital account intermediate addresses, and the digital account destination address, wherein the machine learning based behavior prediction label is based in part on the behavior of entities associated with at least one of crypto exchanges, crypto mixers, bots, hackers, and terrorists.

14. The method of claim 12, further comprising constructing a user interface with interactive visualization of the journey board.

15. A computing apparatus comprising:
a processor; and
a memory storing instructions that, when executed by the processor, configure the apparatus to:
 receive blockchain transaction data from a blockchain ledger to a transaction database, the blockchain transaction data including blockchain addresses, transaction identifications, transaction timestamps, and digital assets transferred;
 receive intelligence labels from a blockchain ecosystem intelligence database, wherein the intelligence labels include known behavioral characteristics of entities associated with the blockchain addresses;
 select a blockchain transaction flow comprising blockchain transaction data associated with a digital account source address, digital account intermediate addresses, a digital account destination address, and intermediate transactions, wherein the intermediate transactions transfer the digital assets between the digital account source address and the digital account destination address;
 receive input trace parameters, wherein the input trace parameters include at least one of an objective directional setting, a tracing constraint, and a transaction filter, the transaction filter based on the transaction timestamps and the digital assets transferred;
 apply the intelligence labels to the digital account source address, the digital account intermediate addresses, and the digital account destination address, thereby creating labeled account addresses;
 apply an artificial intelligence graph search algorithm to the blockchain transaction flow based on the input trace parameters, to determine an auto-traced path of the digital assets in the blockchain transaction flow;
 generate a report including tracing destination summary statistics of the auto-traced path, the report including suspicious blockchain addresses; and
 on condition that the report includes a suspicious blockchain address:
  generate an action including at least one of alerting a user of the suspicious blockchain address, alerting the user to an illicit digital asset transaction associated with the suspicious blockchain address, and suspending transactions by the suspicious blockchain address.

16. The computing apparatus of claim 15, wherein the memory includes at least one of server memory, cloud storage, key value stores, and distributed columnar databases.

17. The computing apparatus of claim 15, wherein the instructions further configure the apparatus to construct a user interface with interactive visualization of a trace path, the interactive visualization including at least one of:
 topological sort to graph layout by the intermediate transactions from the digital account source address to the digital account destination address;
 time-bound trace, wherein the trace path is restricted by at least time and a number of intermediate transactions after a specific transaction;
 value-bound trace, wherein the trace path is based on is based on values of digital assets transferred in the blockchain transaction flow; and
 highlighting of at least a portion of the trace path.

18. The computing apparatus of claim 15, wherein the report includes at least one of:
 a percentage of funding by labeled account address; and
 visualization of the auto-traced path from the digital account source address to the digital account destination address, in an expandable interactive view.

19. The computing apparatus of claim 15, wherein the instructions further configure the apparatus to create an alert timeline, wherein in the alert timeline:
 monitors the suspicious blockchain addresses, based on the intelligence labels, with wallets contain funds that have not been transferred; and
 creates an alert requesting further investigation of the suspicious blockchain addresses with un-transferred funds.

20. The computing apparatus of claim 15, wherein the report includes visualization of all digital asset paths from the digital account source address to the digital account destination address, in an expandable interactive view.

* * * * *